United States Patent
Wilkinson et al.

(10) Patent No.: US 7,134,208 B2
(45) Date of Patent: Nov. 14, 2006

(54) ERGONOMIC HANDLE FOR VEGETATION TRIMMER

(75) Inventors: Sean D. Wilkinson, Brockville (CA); David S. Strong, Battersea (CA); Ted A. Kimball, Oxford Station (CA); Phillip T. Cassidy, Kemptville (CA); Richard P. Rosa, Kingston (CA); Weston J. Van Wambeke, Cockeysville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/417,061

(22) Filed: Apr. 16, 2003

(65) Prior Publication Data
US 2004/0231166 A1 Nov. 25, 2004

Related U.S. Application Data

(63) Continuation-in-part of application No. 29/173,248, filed on Dec. 23, 2002, now Pat. No. Des. 479,677.

(51) Int. Cl.
*B26B 7/00* (2006.01)
*B25G 1/10* (2006.01)
*B26B 27/00* (2006.01)

(52) U.S. Cl. .................... 30/276; 30/296.1; 30/347; 16/436; 56/12.7; 127/121; D15/18

(58) Field of Classification Search .............. 30/276, 30/296.1, 347, 20, 17, 340, DIG. 5; 300/20, 300/17; D8/8, 67, 107; 56/12.7, 16.9, 17.4, 56/255, 239; D32/51, 52; 15/115, 120.1; 16/110.1, 436, 437; 135/114, 139, 140, 69; 172/121, 111, 108; D15/18, 14, 67, 17; 294/53.5, 294/54.5
See application file for complete search history.

(56) References Cited

U.S. PATENT DOCUMENTS 2,062,820 A * 12/1936 Peirce .................... 30/276

(Continued)

FOREIGN PATENT DOCUMENTS

EP 0 005 540 A 11/1979

(Continued)

OTHER PUBLICATIONS

Brad Coffiner, Ergonomic Design of the Snow Shovel, Nov. 25, 1997, http://ergo.human.cornell.edu/ErgoProjects/97PROJECTS/coffiner.htm, pp. 1-4 are pertinent.*

(Continued)

*Primary Examiner*—Boyer D. Ashley
*Assistant Examiner*—Edward Landrum
(74) *Attorney, Agent, or Firm*—Harness, Dickey & Pierce, P.L.C.

(57) ABSTRACT

A vegetation trimmer having a head, a handle and an intermediate portion interconnecting the head to the handle. The intermediate portion is configured to include a first portion, a second portion and a third portion that are each arranged about a respective axis. The first portion is coupled to the primary handle at a first end and to the second portion at a second end. The second portion is coupled to the third portion at an end of the second portion opposite its connection to the first portion and an opposite end of the third portion is coupled to the head. The axis of the second portion is skewed to the axes of the first and third portions.

19 Claims, 21 Drawing Sheets

U.S. PATENT DOCUMENTS

| | | | |
|---|---|---|---|
| 2,485,963 A * | 10/1949 | Godfrey | 464/99 |
| 3,448,748 A * | 6/1969 | Walrave | 135/127 |
| 3,597,842 A | 8/1971 | Greene | |
| 3,635,233 A * | 1/1972 | Robertson | 135/71 |
| 3,730,544 A * | 5/1973 | Hyman | 280/819 |
| 3,826,068 A * | 7/1974 | Ballas et al. | 56/12.7 |
| 4,047,299 A * | 9/1977 | Bair | 300/276 |
| 4,052,789 A * | 10/1977 | Ballas, Sr. | 30/276 |
| 4,122,601 A | 10/1978 | Katsuya | |
| 4,134,204 A * | 1/1979 | Perdue | 30/276 |
| D251,699 S | 5/1979 | Averitt | |
| 4,188,719 A | 2/1980 | Hoff | |
| D256,769 S | 9/1980 | Irelan | |
| 4,274,201 A * | 6/1981 | Oberg et al. | 30/276 |
| 4,378,644 A * | 4/1983 | Tuggle et al. | 37/244 |
| 4,397,088 A * | 8/1983 | Hampel | 30/296.1 |
| 4,611,946 A * | 9/1986 | Gebelius | 403/102 |
| 4,651,422 A | 3/1987 | Everts | |
| 4,721,125 A * | 1/1988 | Wang-Lee | 135/69 |
| 4,809,388 A | 3/1989 | Dietrich | |
| D301,009 S | 5/1989 | Pilatowicz et al. | |
| 4,829,675 A * | 5/1989 | Beihoffer | 30/276 |
| 4,860,451 A | 8/1989 | Pilatowicz et al. | |
| D305,198 S | 12/1989 | White et al. | |
| 4,894,914 A * | 1/1990 | Mead | 30/276 |
| D307,860 S | 5/1990 | Ellis | |
| 4,979,531 A * | 12/1990 | Toor et al. | 135/127 |
| D317,852 S | 7/1991 | Fujiwara et al. | |
| D320,398 S | 10/1991 | Clivio | |
| 5,060,343 A * | 10/1991 | Nisenbaum | 16/421 |
| 5,159,769 A * | 11/1992 | Odorisio | 37/278 |
| 5,165,144 A * | 11/1992 | Nisenbaum | 16/421 |
| 5,181,369 A | 1/1993 | Everts | |
| D343,554 S | 1/1994 | Watanabe et al. | |
| 5,276,969 A | 1/1994 | Luick | |
| D349,220 S | 8/1994 | Griffin | |
| D349,221 S | 8/1994 | Griffin | |
| D354,892 S | 1/1995 | Griffin | |
| D359,605 S | 6/1995 | Janikowski | |
| D361,701 S | 8/1995 | Pink | |
| D367,595 S | 3/1996 | Dahlberg et al. | |
| D368,005 S | 3/1996 | Lemcke | |
| D369,071 S | 4/1996 | Tuggle et al. | |
| D380,359 S | 7/1997 | Meisner et al. | |
| D381,875 S * | 8/1997 | Spear et al. | D8/10 |
| D382,450 S | 8/1997 | Meisner et al. | |
| D382,778 S | 8/1997 | Meisner et al. | |
| D382,779 S | 8/1997 | Meisner et al. | |
| D382,780 S | 8/1997 | Meisner et al. | |
| 5,662,428 A * | 9/1997 | Wilson | 403/374.5 |
| 5,669,101 A * | 9/1997 | Aiyama et al. | 16/436 |
| 5,787,590 A * | 8/1998 | D'Alessandro, Sr. | 30/296.1 |
| 5,867,911 A | 2/1999 | Yates et al. | |
| 5,920,944 A | 7/1999 | Biggs et al. | |
| 5,933,966 A | 8/1999 | Yates et al. | |
| D414,388 S | 9/1999 | Wright | |
| 5,950,317 A | 9/1999 | Yates et al. | |
| D417,320 S | 11/1999 | Nunez | |
| 5,984,393 A * | 11/1999 | Washington | 294/53.5 |
| D417,371 S | 12/1999 | Searle et al. | |
| 6,052,976 A | 4/2000 | Cellini et al. | |
| 6,055,998 A * | 5/2000 | Bader | 135/69 |
| 6,076,265 A * | 6/2000 | Huang Lo | 30/265 |
| D427,861 S | 7/2000 | Cooper et al. | |
| 6,116,349 A * | 9/2000 | Wilson | 172/14 |
| 6,145,524 A * | 11/2000 | Li et al. | 135/67 |
| D440,131 S | 4/2001 | Aglassinger et al. | |
| 6,260,278 B1 * | 7/2001 | Faher | 30/276 |
| D446,699 S | 8/2001 | Marshall et al. | |
| 6,324,764 B1 | 12/2001 | Watkins | |
| D463,230 S | 9/2002 | Robson | |
| 6,516,598 B1 * | 2/2003 | Notaras et al. | 56/16.7 |
| D473,114 S | 4/2003 | Van Wambeke | |
| D473,115 S | 4/2003 | Van Wambeke | |
| D476,200 S | 6/2003 | Van Wambeke | |
| D479,676 S * | 9/2003 | Van Wambeke et al. | D8/8 |
| D479,677 S * | 9/2003 | Van Wambeke et al. | D8/8 |
| D479,962 S * | 9/2003 | Van Wambeke et al. | D8/8 |
| D481,596 S * | 11/2003 | Van Wambeke et al. | D8/8 |
| 2002/0117196 A1 * | 8/2002 | Han | 135/114 |
| 2003/0131448 A1 * | 7/2003 | Dickhaus | 16/430 |

FOREIGN PATENT DOCUMENTS

| | | |
|---|---|---|
| EP | 1249317 A2 * | 10/2002 |
| EP | 1 327 502 A2 | 7/2003 |
| GB | 1 583 521 A | 1/1981 |

OTHER PUBLICATIONS

USSN: 29/161,736, filed: Jun. 4, 2002, entitled: Vegetation Trimmer With Guard, Inventor: Van Wambeki et al.

* cited by examiner

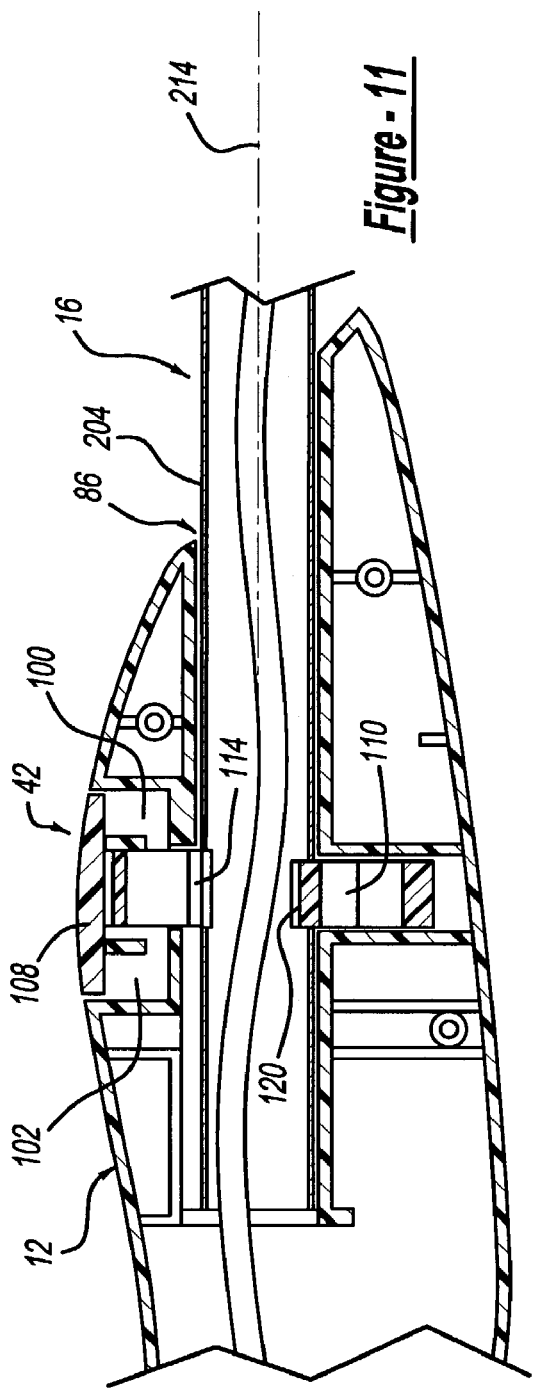
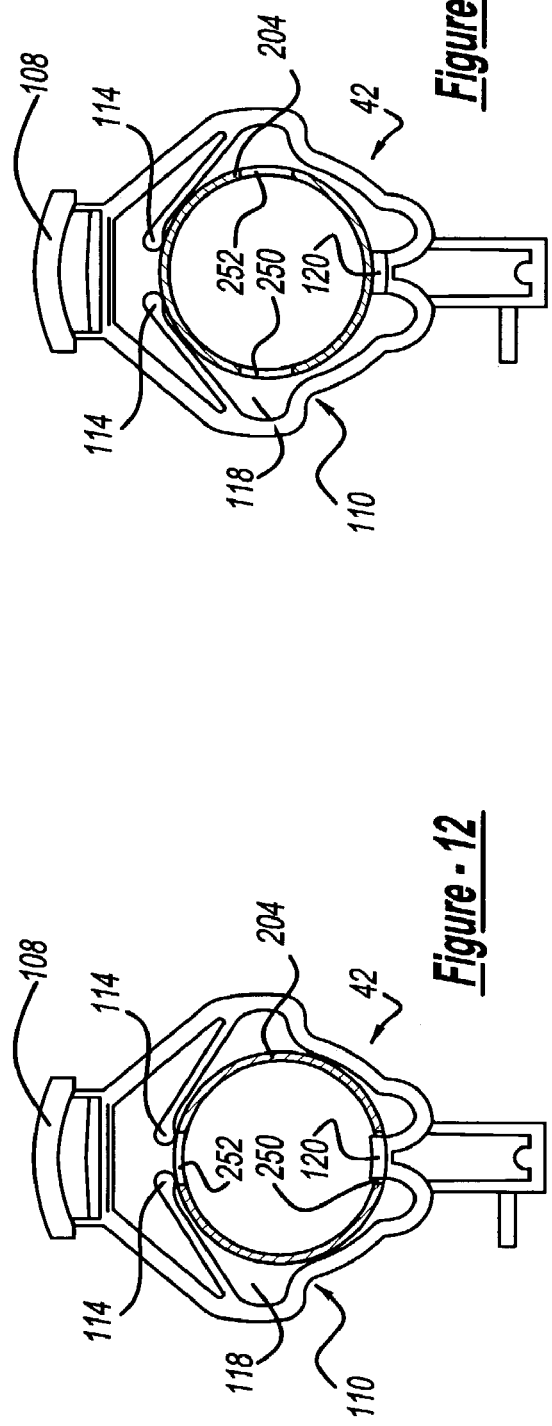
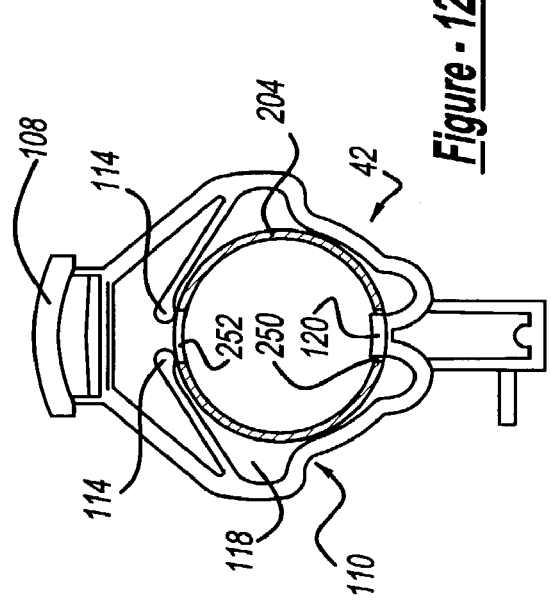

ERGONOMIC HANDLE FOR VEGETATION TRIMMER

This application is a continuation-in-part of U.S. patent Ser. No. 29/173,248 filed on Dec. 23, 2002 which issued as U.S. Design Pat. No. D479,677 on Sep. 16, 2003.

FIELD OF THE INVENTION

The present invention generally relates to vegetation trimmers and more particularly to a vegetation trimmer having an intermediate portion between a trimmer head and a handle which is configured to place the vegetation trimmer's center of gravity relatively closer to the user's hands to thereby better balance the vegetation trimmer.

BACKGROUND OF THE INVENTION

Hand-held electrically powered vegetation trimmers are typically configured with a handle portion, a trimmer head and an intermediate portion that interconnects the handle portion and the trimmer head. The handle portion usually includes a "live" or primary handle having a grip for a first hand of the user and a trigger or other means for actuating the trimmer head. A "dead" or auxiliary handle is also typically provided to provide a grip for the second hand of the user. The auxiliary handle may be coupled to the handle portion or to the intermediate portion. The intermediate portion typically employs a straight member, which may be tubular, through which the wires that couple the handle portion to the trimmer head extend.

Despite the popularity of such designs, we have noted several drawbacks. One such drawback concerns the placement of the vegetation trimmer's center of gravity relative to the handles. More specifically, as the trimmer head usually includes an electric motor, and as the electric motor usually accounts for the majority of the weight of the vegetation trimmer, the center of gravity is typically positioned a considerable distance from the user's hands, thereby providing the vegetation trimmer with a somewhat unbalanced feeling, which could provide some users with the impression that the unit was somewhat awkward and/or uncomfortable to control.

Other drawbacks concern the amount of clearance for the body of the user and the swath of the trimmer head. The horizontal clearance provided by a "straight" intermediate portion reduces relatively rapidly and is therefore more likely to contact the body of the user. To overcome this drawback, the intermediate may be lengthened, which will further negatively affect the positioning of the center of gravity as discussed above. Alternatively, or the user could either operate the vegetation trimmer in a manner that limits the swath of the trimmer head or with their arms extended so as to place the vegetation trimmer relatively further away from their body.

Efforts for mitigating the effect of a relative large distance between the handle portion and the center of gravity include extending the auxiliary handle from the axis of the intermediate portion by a relatively large distance. Several new drawbacks are created by this approach, however. Given the size of the extended auxiliary handle and the costs of packaging, it is usually not practical to factory-install an extended length auxiliary handle, since this would reduce the efficiency with which the unit is packaged and thereby increase packaging and shipping costs.

Another drawback of relatively large auxiliary handles concerns the lever-arm effect that the auxiliary handle generates on the joint at which the auxiliary handle is coupled to the unit. As those skilled in the art will appreciate, large auxiliary handles are not desired, since their length proportionally affects the torque that is transmitted to the joint.

Accordingly, there remains a need in the art for an improved vegetation trimmer that employs an intermediate that is configured to place the vegetation trimmer's center of gravity relatively closer to the user's hands to thereby better balance the vegetation trimmer.

SUMMARY OF THE INVENTION

In one preferred form, the present invention provides a vegetation trimmer having a head, a handle and an intermediate portion interconnecting the head to the handle. The intermediate portion is configured to include a first portion, a second portion and a third portion that are each arranged about a respective axis. The first portion is coupled to the primary handle at a first end and to the second portion at a second end. The second portion is coupled to the third portion at an end of the second portion opposite its connection to the first portion and an opposite end of the third portion is coupled to the head. The axis of the second portion is skewed to the axes of the first and third portions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 11 is a longitudinal cross section view of a portion of the vegetation trimmer of FIG. 1 illustrating the coupling of the intermediate portion to the head;

FIG. 12 is an elevation view in partial cross section illustrating the relationship between the retainer and the intermediate portion when the key of the retainer is engaged to a keyhole in the intermediate portion;

FIG. 13 is a view similar to that of FIG. 12 except that the key has been disengaged from the keyhole to permit the intermediate portion to be rotated relative to the retainer;

DETAILED DESCRIPTION OF THE PREFERRED EMBODIMENTS

Figure 1:
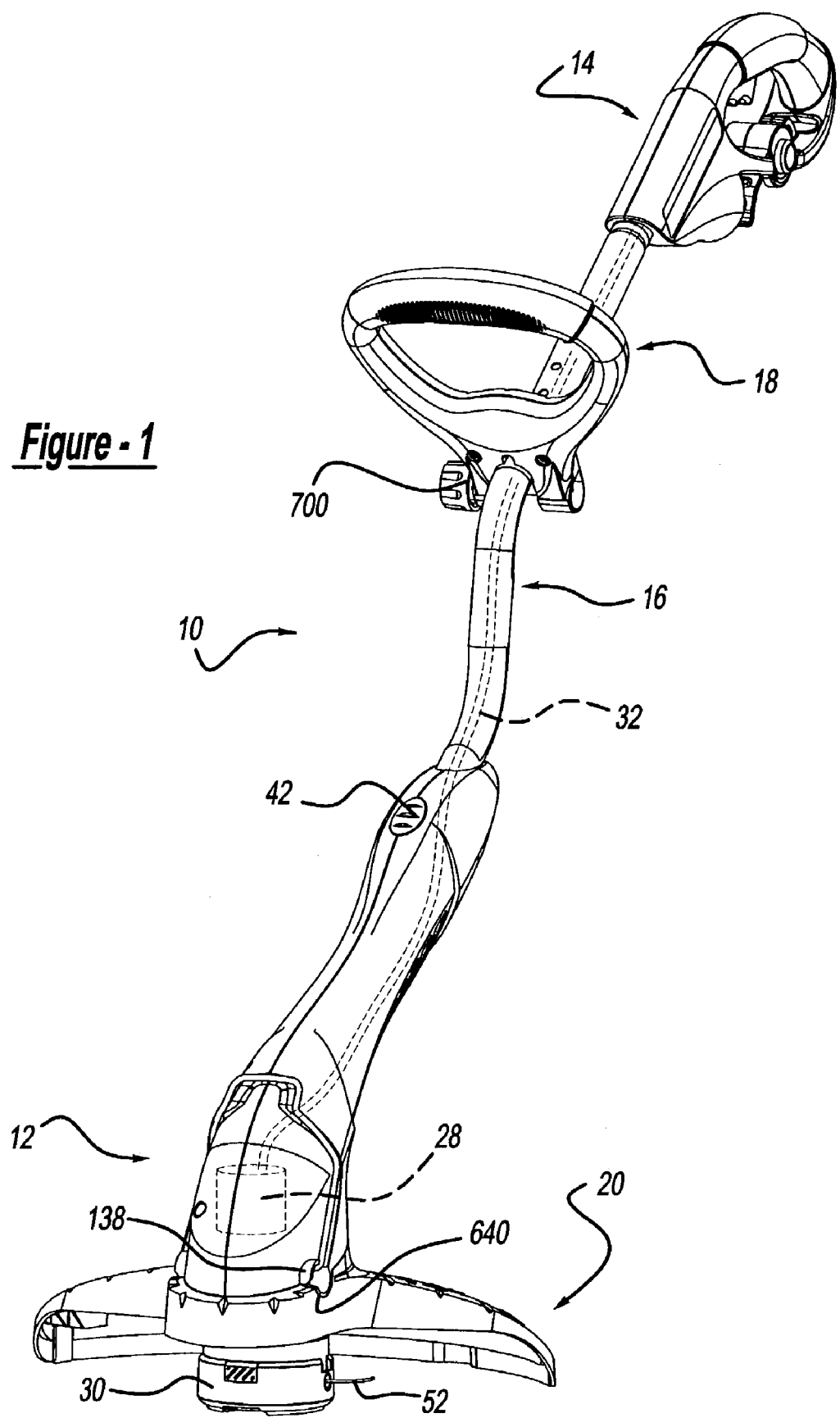
FIG. 1 is a perspective view of a vegetation trimmer constructed in accordance with the teachings of the present invention.

With reference to FIG. 1 of the drawings, a vegetation trimmer constructed in accordance with the teachings of the present invention is generally indicated by reference numeral 10. The vegetation trimmer 10 is illustrated to include a head 12, a handle 14, an intermediate portion 16, an auxiliary handle 18, and a trimmer guard 20. The head 12 conventionally houses an electric motor 28 to which a tool head 30 is coupled for rotation. The intermediate portion 16 interconnects the handle 14 and the head 12 and serves as a conduit through which a wire 32 is disposed for electrically interconnecting the handle 14 and the motor 28. The auxiliary handle 18, which may be coupled to either the handle 14 or to the intermediate portion 16, is illustrated in the particular example provided to have a loop or D-shape that may be comfortably gripped by the user for additional support and control. Those skilled in the art will appreciate that the auxiliary handle 18 may be differently shaped, however. The trimmer guard 20 is configured to be attached to the head 12 and to shroud at least a portion of the tool head 30.

Head of the Vegetation Trimmer

Figure 2:
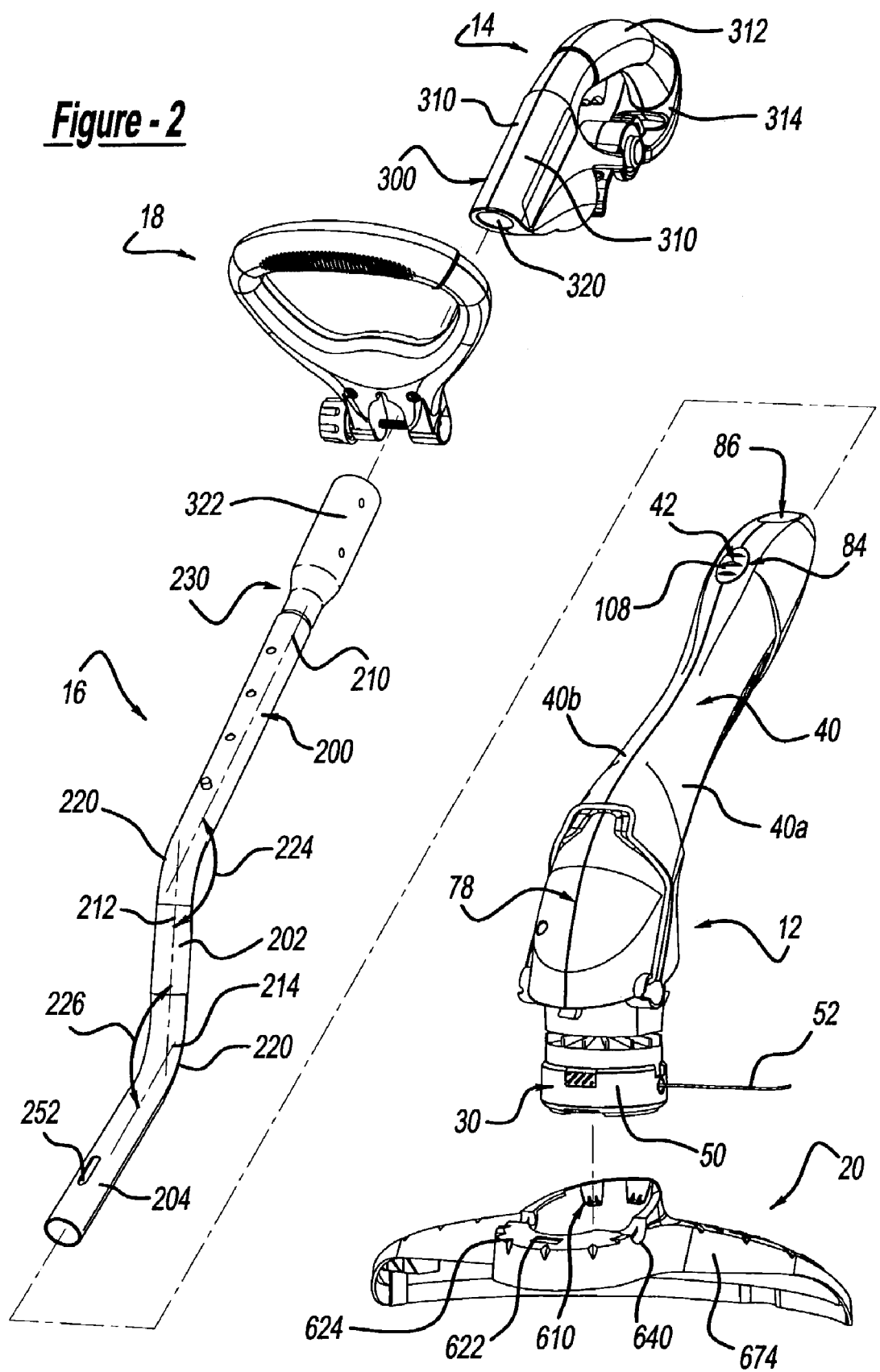
FIG. 2 is an exploded perspective view of the vegetation trimmer of FIG. 1.
Figure 3:
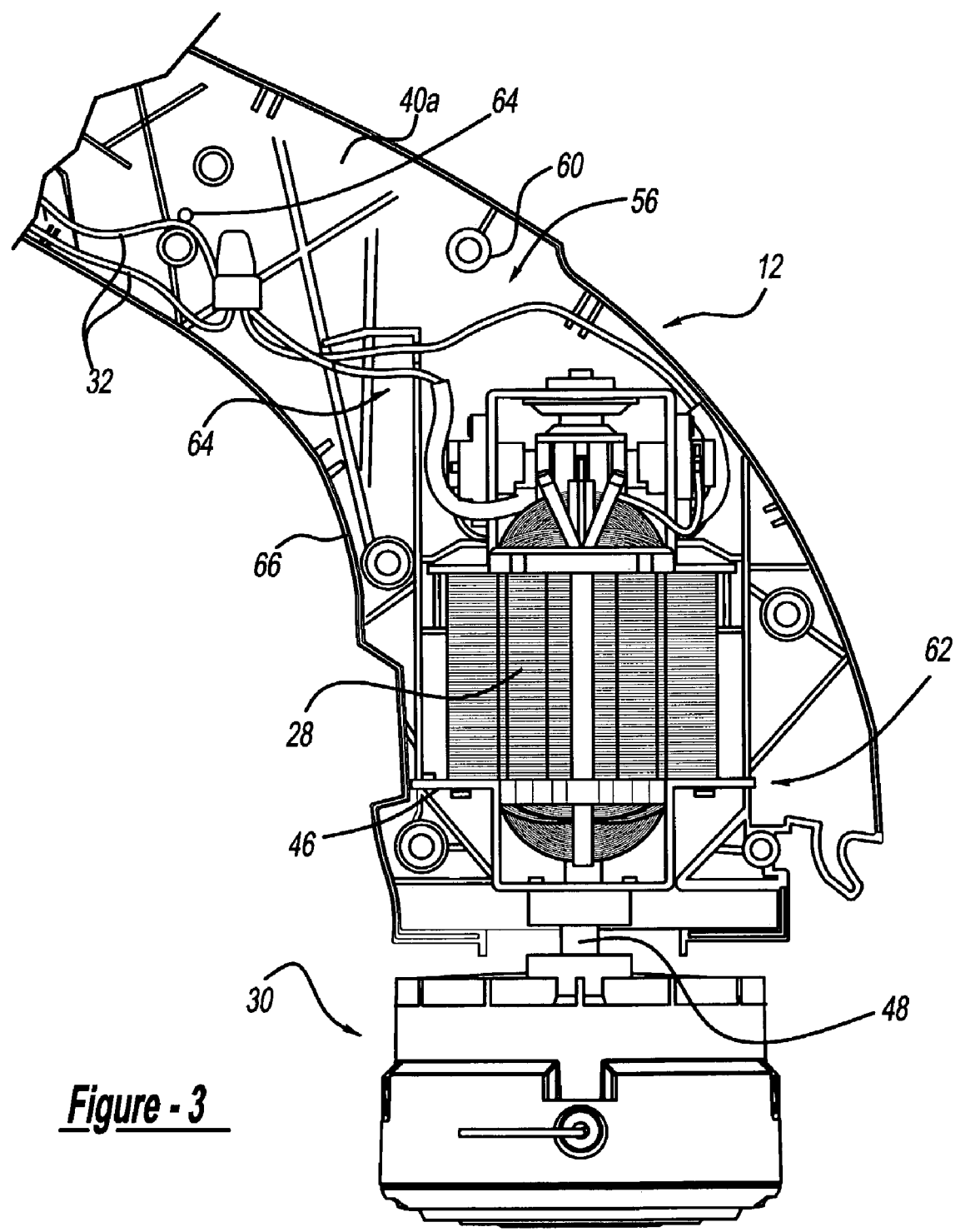
FIG. 3 is a side elevation view in partial section illustrating the head of the vegetation trimmer.
Figure 4:
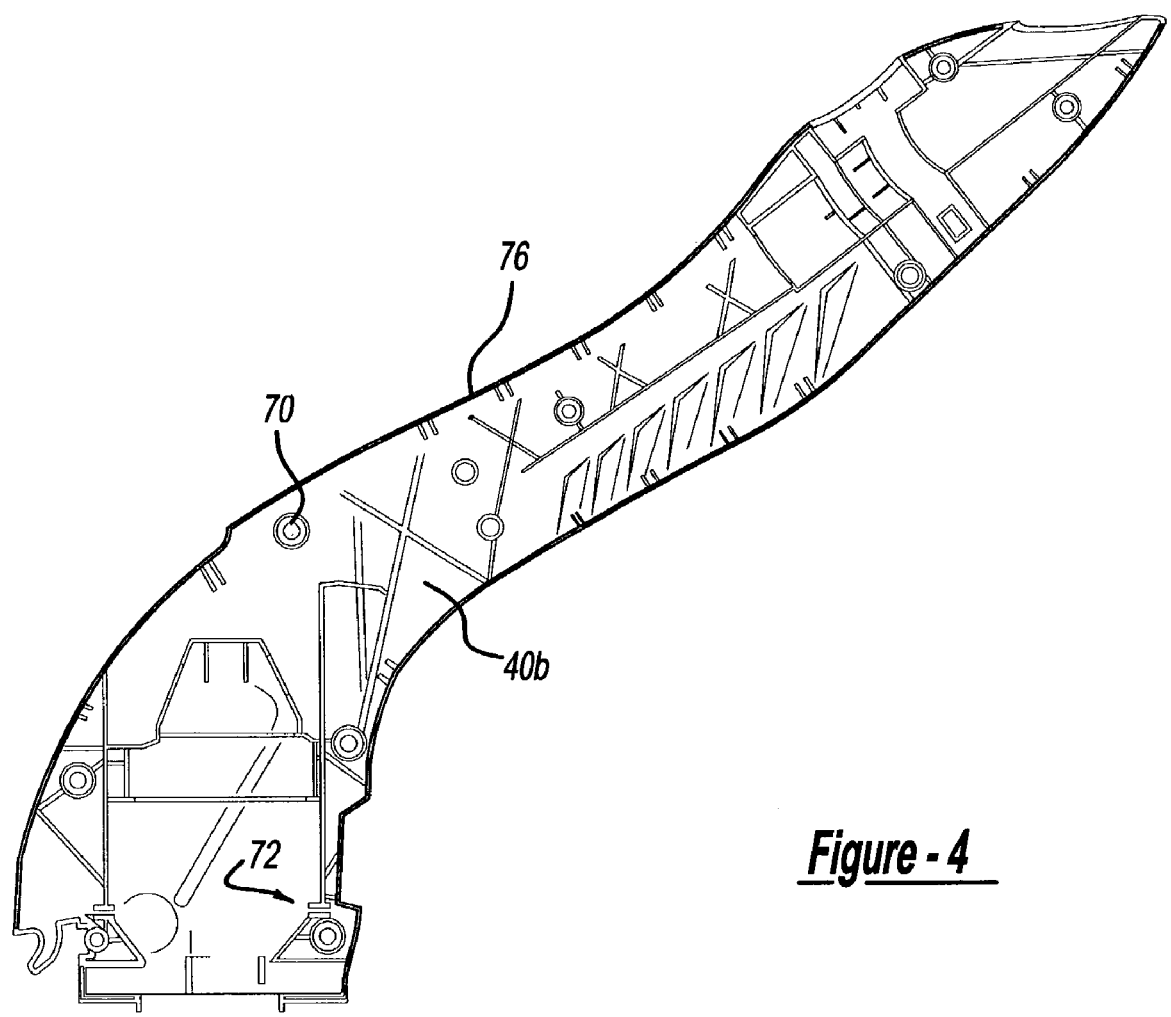
FIG. 4 is a side elevation view of a portion of the vegetation trimmer of FIG. 1, illustrating the housing shell of the head in greater detail.

As shown in FIGS. 2 through 4, the head 12 includes the motor 28, the tool head 30, a housing 40, and a retainer 42. The motor 28 is conventional in its construction and operation and includes a mounting flange 46, which is employed to mount the motor 28 to the housing 40, and an output shaft 48 to which the tool head 30 is coupled for rotation. In the particular example provided, the tool head 30 is illustrated to include a spool 50 for dispensing a line or filament 52 and is of the type that is well known in the art. Those skilled in the art will appreciate, however, that the tool head 30 may be otherwise configured and may include, for example, chains and/or blades in addition to or in lieu of the spool 50 and filament 52 that are illustrated.

The housing 40 includes a pair of housing shells 40a and 40b that cooperate to define a cavity 56 that houses the motor 28. The housing shell 40a includes a plurality of first screw bosses 60, a motor flange mount 62, one or more wire retention forks 64 and a labyrinth groove 66, while the housing shell 40b includes a plurality of second screw bosses 70, a motor flange mount 72, and a labyrinth member 76. The first screw bosses 60 are configured to be received into the second screw bosses 70 to thereby aid in locating the housing shells 40a and 40b to one another. Threaded fasteners (not shown) are employed in conjunction with the first and second screw bosses 60 and 70 in a conventional and well known manner to secure the housing shells 40a and 40b to one another. The motor flange mounts 62 and 72 are configured to engage the mounting flange 46 of the motor 28 to thereby prevent axial or rotational movement of the motor 28 relative to the housing 40. Each wire retention fork 64 conventionally defines a U-shaped aperture (not specifically shown) into which the wire 32 that electrically couples the motor 28 to the handle 14 may be placed to secure the wire 32 in a known and desired location. The labyrinth groove 66 is configured to receive the labyrinth member 76 when the housing shells 40a and 40b are mated to one another to thereby create a labyrinth seal 78 that prevents debris and moisture from migrating between the joint that is formed by the housing shells 40a and 40b into the cavity 56.

Figure 5:
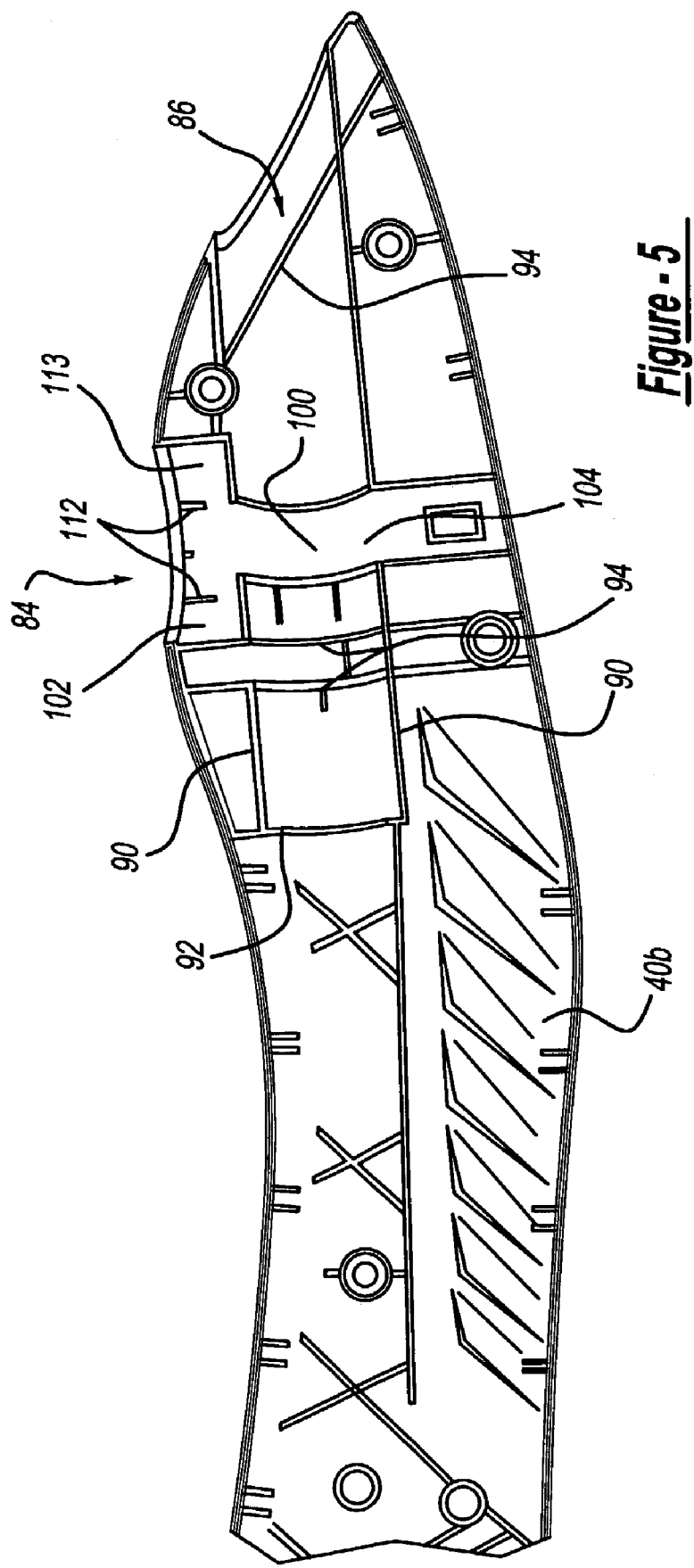
FIG. 5 is an enlarged portion of FIG. 4 illustrating the coupling recess in greater detail.

With reference to FIGS. 2 and 5, the housing shells 40a and 40b cooperate to define a mount 84 for the retainer 42 and a hollow coupling recess or cavity 86 into which a first end of the intermediate portion 16 is slidably inserted. A pair of spaced apart sidewalls 90 are employed in each housing shell 40a and 40b to form half of the hollow cavity 86. A lower wall 92 is employed to limit the amount by which the intermediate portion 16 may be inserted into the housing 40, while a plurality of conforming gussets 94 interconnect and strengthen the sidewalls 90 as well as support the section of the intermediate portion 16 which is inserted into the housing 40.

In the particular example provided, the mount 84 for the retainer 42 defines a generally T-shaped aperture 100, with a first or outer portion 102 of the aperture 100 being configured to receive a push button 108 of the retainer 42 and the second or inner portion 104 of the aperture 100 being configured to receive the stem 110 (FIG. 6) of the retainer 42. A plurality of guides 112 extend inwardly from the wall 113 of each housing shell 40a, 40b into the outer and inner portions 102 and 104 of the aperture 100 and operably guide the push button 108 and the stem 110, respectively, when the retainer 42 translates in the aperture 100 as will be described in detail, below.

Figure 6:
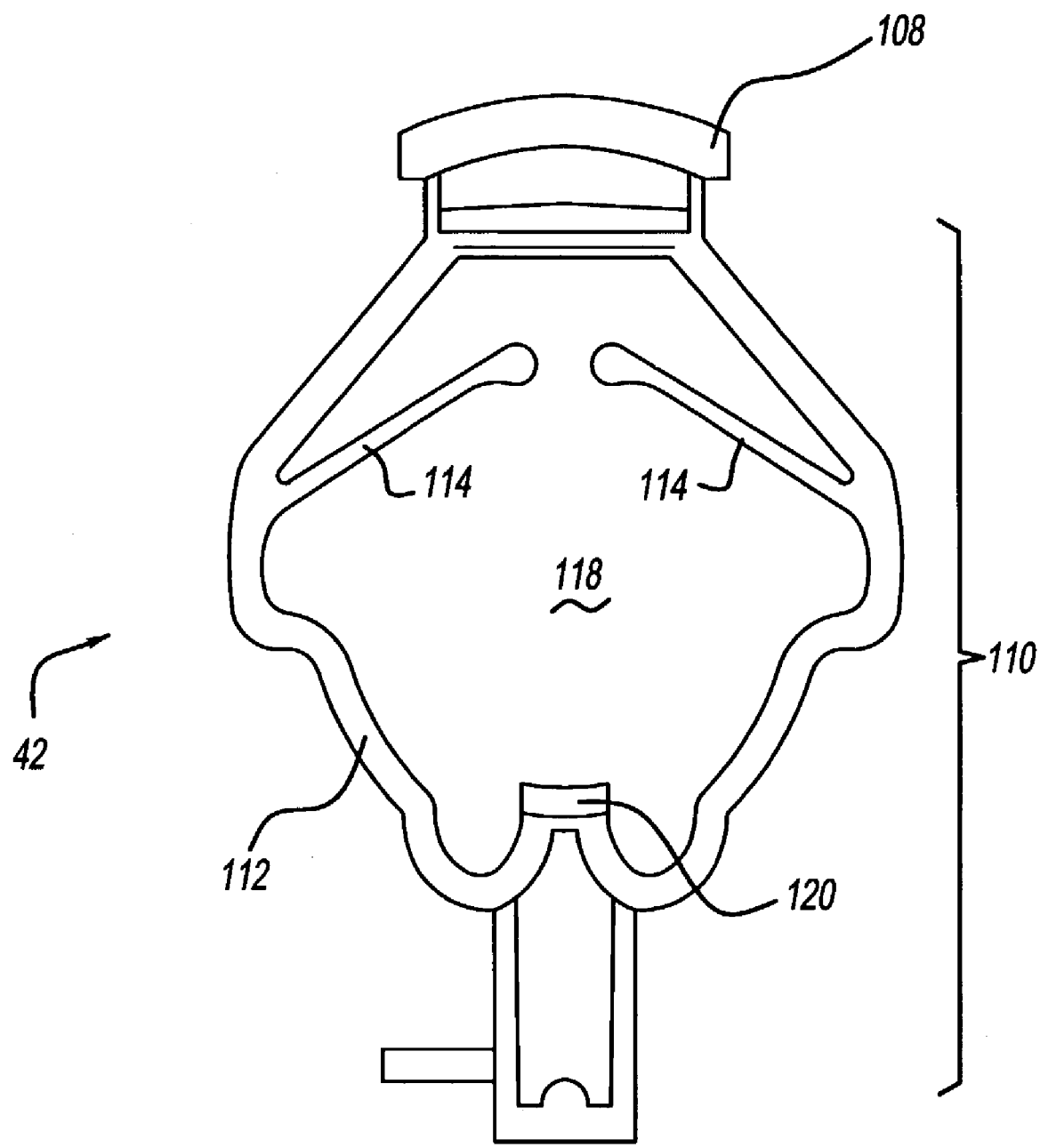
FIG. 6 is an elevation view of a portion of the head, illustrating the retainer in greater detail.
Figure 7:
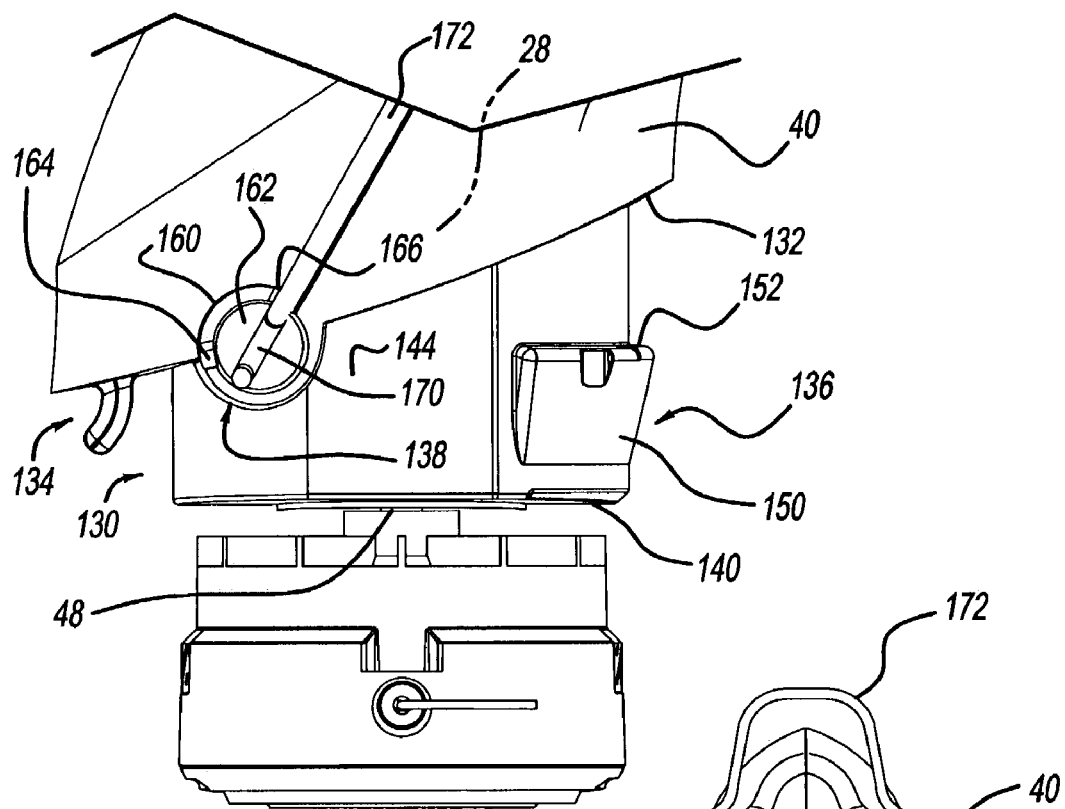
FIG. 7 is a left side elevation view of the head.

In FIGS. 2, 6 and 7, the retainer 42 of the particular example provided is illustrated to include an actuator portion, such as a push button 108, and a stem 110 that is interconnected to the push button 108. As noted above, the push button 108 is configured to be received into the outer portion 102 of the aperture 100 in the housing 40 and supported laterally via a first portion of the guides 112, while the stem 110 is configured to be received into the inner portion 104 of the aperture 100 and supported laterally via a second portion of the guides 112. The stem 110 includes an annular portion 112 and a pair of spring tabs 114 that extends from the opposite sides of the annular portion 112. The annular portion 112 and the spring tabs 114 cooperate to form an aperture 118 that is sized to receive the intermediate portion 16. The annular portion 112 further includes a key 120 that is positioned opposite the spring tabs 114 and which extends upwardly into the aperture 118.

Figure 8:
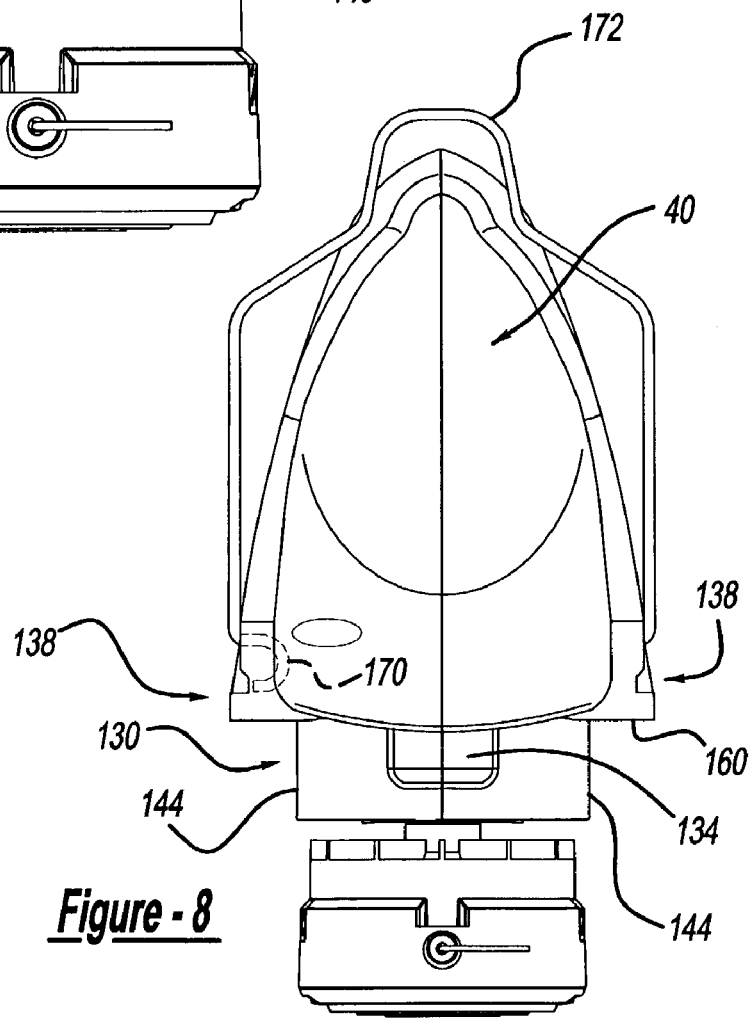
FIG. 8 is a front elevation view of the head.

As shown in FIGS. 7 and 8, the housing 40 may further include a projecting stem 130, an abutting wall 132, an engagement hook 134, an engagement ramp 136 and a pair of bosses 138. The projecting stem 130 extends in a downward direction and terminates at an end wall 140 through which the output shaft 48 of the motor 28 extends. The opposite lateral sides 144 of the projecting stem 130 are flattened somewhat to provide clearance when the trimmer guard 20 (FIG. 1) is installed to the housing 40. The abutting wall 132 is spaced apart from the end wall 140 and is skewed to projecting stem 130 and the end wall 140.

The engagement hook 134 is generally arcuate in shape, extending downwardly from the abutting wall 132 and in a direction forwardly of the projecting stem 130. The engagement ramp 136 is fixed to the projecting stem 130 and extends in a direction opposite the engagement hook 134 (i.e., rearwardly in the example illustrated). The engagement ramp 136 includes a tapered leg 150 that terminates abruptly at an abutting face 152. Optional clearance recesses 154 may be formed into the tapered legs 150 to provide additional clearance to aid the user in removing the trimmer guard 20 if this should provide necessary.

The bosses 138 extend generally perpendicular to the projecting stem 130 at a location that is offset somewhat forwardly from the output shaft 48 of the motor 28. Each boss 138 includes a generally cylindrical wall segment 160 that intersects the abutting wall 132 and which defines a hollow recess 162 that terminates in a spherical radius. A first groove 164 is formed in a forward facing portion of the wall segment 160 and a second groove 166 is formed in an upwardly and rearwardly facing portion of the wall segment 160.

The hollow recesses 162 are configured to receive the opposite lateral ends 170 of a front guard 172. In the example provided, the lateral ends 170 are defined by a radius that is configured to match the spherical radius at which each hollow recess 162 terminates so that the lateral ends 170 will pivot relative to their associated boss 138. The wall segment 160 is sized to inhibit the withdrawal of the lateral ends 170 from the bosses 138, while the first and second grooves 164 and 166 are sized so as to selectively engage the lateral ends 170 to maintain the front guard 172 in an extended or retracted position, respectively.

Intermediate Portion of the Vegetation Trimmer

The intermediate portion 16 includes a first portion 200, a second portion 202 and a third portion 204 wherein each of the first, second and third portions 200, 202 and 204 are configured about a respective axis (i.e., axes 210, 212 and 214, respectively) such that the axis 212 is skewed to both axes 210 and 214. Stated another way, the second portion 202 of the intermediate portion 16 is skewed to both the first and third portions 200 and 204. In one form, the intermediate portion 16 may be comprised of a plurality of segments (not shown) that are joined to one another as by welding, for example. Alternatively, a radiused transition 220 may be employed at the intersection between the first and second portions 200 and 202 and the second and third portions 202 and 204 as shown to thereby simplify the manufacture of the intermediate portion 16 and reduce its cost.

Preferably, the interior angle 224 between axes 210 and 212 is an obtuse angle, ranging from between about 110 degrees to about 150 degrees and more preferably between about 130 degrees to about 140 degrees. Also preferably, the interior angle 226 between the axes 212 and 214 is an obtuse angle, ranging from between about 110 degrees to about 150 degrees and more preferably between about 130 degrees to about 140 degrees. Preferably, the axes 210 and 214 are parallel one another so that the interior angles 224 and 226 are equal and that the second portion 202 of the intermediate portion 16 is located in a generally vertical condition when the intermediate portion 16 is positioned in an operating orientation as illustrated in FIG. 9.

With regard to the relative lengths of the various portions of the intermediate portion 16, we presently prefer that the first portion 200 comprise about 40 percent to about 70 percent of the developed length of the intermediate portion 16, while the second portion 202 comprise about 10 percent to about 30 percent of the developed length of the intermediate portion 16. In the particular example provided, the intermediate portion 16 has a developed length of about 28.8 inches (730 mm) in a fully telescoped or extended condition, the first portion 200 has a length of about 16 inches (406 mm) or about 55.7% of the developed length, and the second portion 202 has a length of about 5.3 inches (133 mm) or about 18.3% of the developed length.

Figure 9:
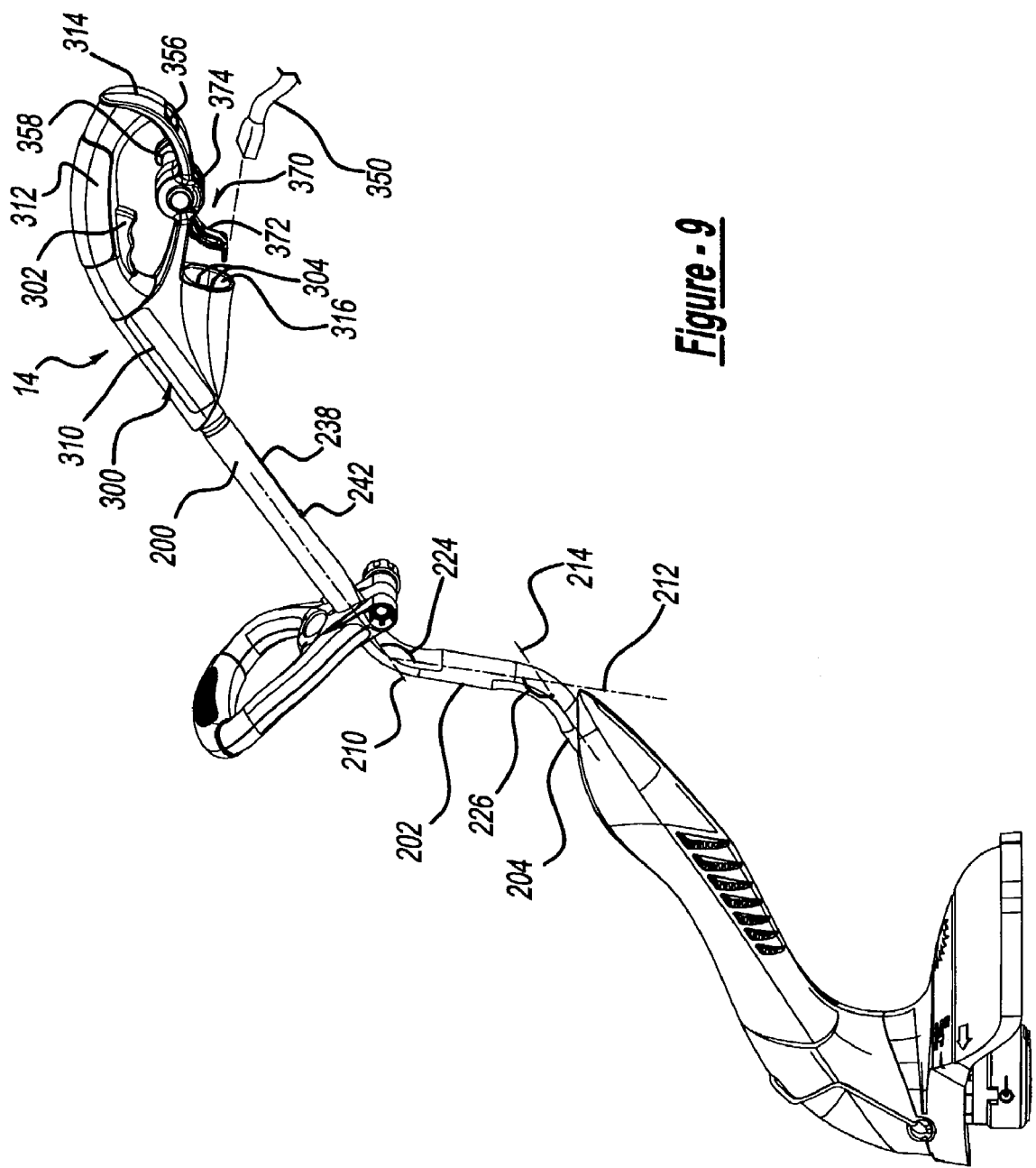
FIG. 9 is a perspective view of the vegetation trimmer of FIG. 1 as positioned in the operating orientation.
Figure 10:
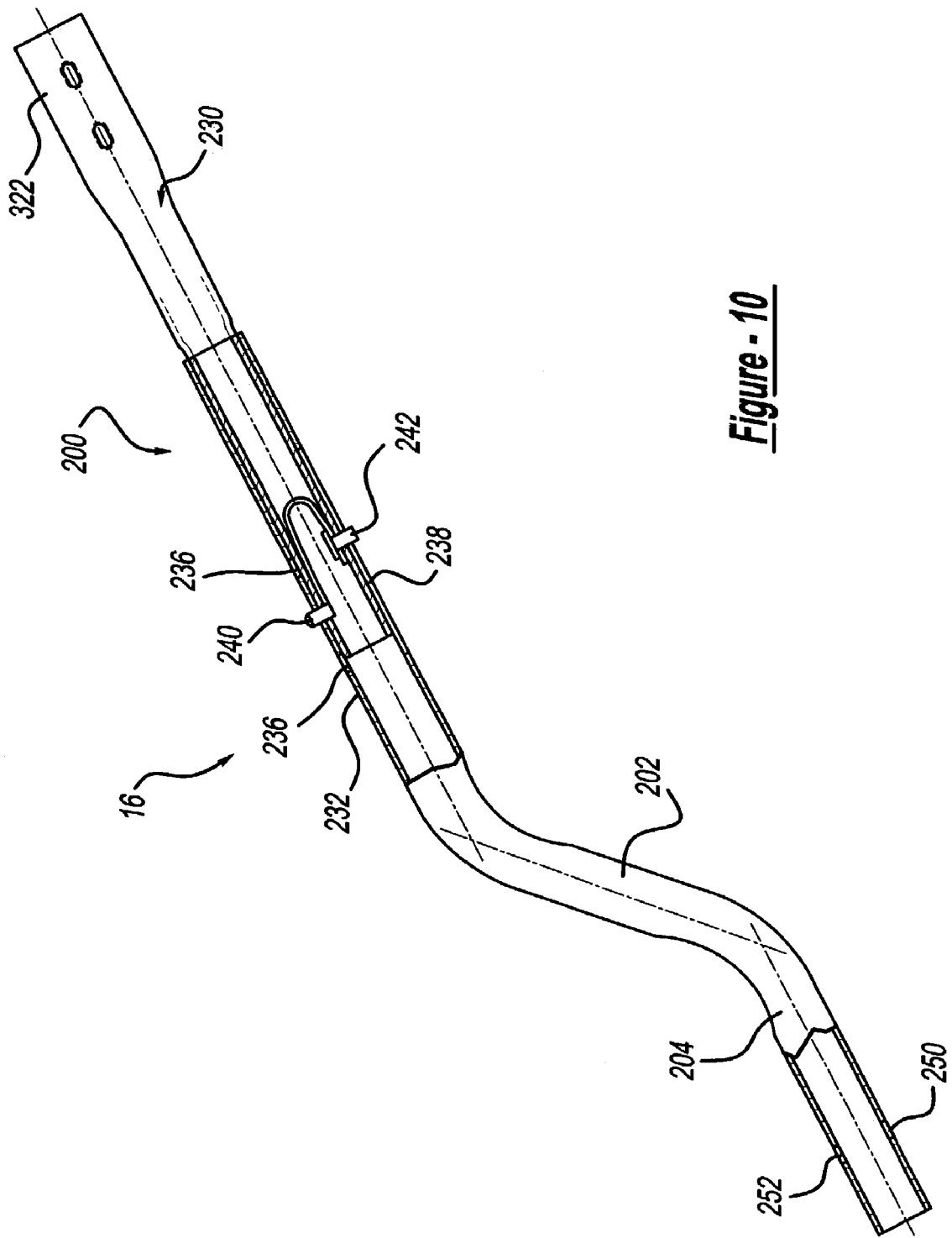
FIG. 10 is a side elevation view of a portion of the vegetation trimmer of FIG. 1, illustrating the intermediate portion in greater detail.

In the particular example illustrated in FIGS. 9 and 10, the first portion 200 includes an upper member 230, which is configured to be fixedly coupled to the handle 14, and a lower member 232 into which the upper member 230 is telescopically inserted. The lower member 232 of the first portion 200 includes a plurality of detent holes 236 that are arranged generally in-line with one another on a first side of the lower member 232 and a slotted aperture 238 that is positioned opposite the detent holes 236. The upper member 230, which is inserted into the lower member 232, includes a conventional spring-biased detent pin 240 that may be selectively engaged to one of the detent holes 236 to fix the location of the upper and lower members 230 and 232 relative to one another. A rivet 242 is coupled to the upper member 230 opposite the detent pin 240 and is disposed in the slotted aperture 238. The slotted aperture 238 is sized to permit extension and retraction of the upper and lower members 230 and 232 relative to one another through the full range of the detent holes 236. Accordingly, the slotted aperture 238 and the rivet 242 cooperate to prevent the upper and lower members 230 and 232 from rotating relative to one another and to prevent the upper member 230 from being inserted too deeply into or withdrawn too far from the lower member 232. Those skilled in the art will appreciate, however, that the intermediate portion 16 could be constructed somewhat differently and need not be telescopic in nature.

The third portion 204 includes a first keyhole 250 and a second keyhole 252 that is located opposite the first keyhole 250. Each of the first and second keyholes 250 and 252 is sized to receive the key 120 (FIG. 6) that is formed on the stem 110 (FIG. 6) of the retainer 42 (FIG. 6). With reference to FIGS. 11 through 13, the third portion 204 of the intermediate portion 16 is disposed in the aperture 118 in the stem 110 of the retainer 42 and the key 120 is engaged to an associated one of the first and second keyholes 250 and 252. When the orientation of the head 12 relative to intermediate portion 16 is desired, as when shipping or storing the vegetation trimmer 10, a user may force the push button 108 downwardly in the outer portion 102 of the aperture 100 to thereby drive the stem 110 downwardly to deflect the spring tabs 114 toward the push button 108 and disengage the key 120, which permits relative rotation between the head 12 and the intermediate portion 16. In the particular example illustrated, the inner face of the key 120 is arcuately shaped to conform to the outer diameter of the third portion 204 of the intermediate portion 16.

After the key 120 and the keyhole (e.g., the first keyhole 250) are positioned in an unaligned condition, the user may release the push button 108 since the spring tabs 114 apply a force against the third portion 204 of the intermediate portion 16 that biases the key 120 against the intermediate portion 16 in a direction that is generally transverse to the axis 214. When the key 120 is aligned to the other keyhole (e.g., the second keyhole 252), the force exerted by the spring tabs 114 moves the stem 110 in a direction out of the aperture 100 so that the key 120 is inserted into the keyhole to thereby inhibit relative rotation between the head 12 and the intermediate portion 16.

Handle of the Vegetation Trimmer

Returning to FIG. 9, the handle 14 is illustrated to include a handle housing 300, a conventional switch 302 and a pair of electrical contacts 304. The handle housing 300 includes a pair of housing shells 310 that cooperate to define a primary handle 312, a hand guard 314, which is configured to shroud the user's hand at a location below the primary handle 312, a cord recess 316 and a means for housing the various components of the handle 14, including the switch 302 and the electrical contacts 304.

Figure 14:
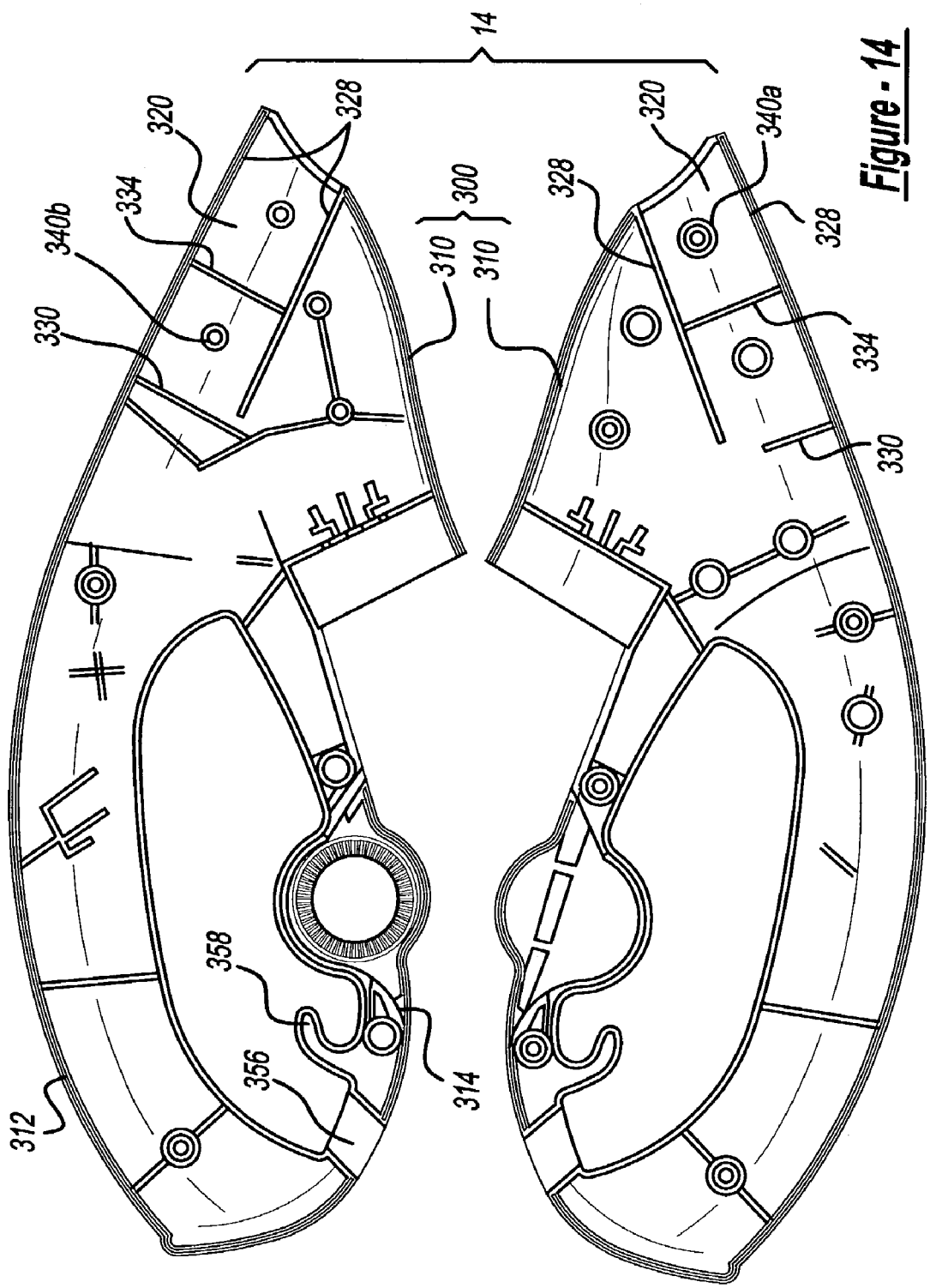
FIG. 14 is an exploded view of a portion of the vegetation trimmer of FIG. 1, illustrating the handle in greater detail.

In a manner that is similar to that of the housing shells 40*a* and 40*b* of FIG. 2, the housing shells 310 cooperate to form a hollow cavity or coupling recess 320 into which is disposed a coupling neck 322 that is formed onto the upper member 230 of the first portion 200 of the intermediate portion 16. With additional reference to FIG. 14, a pair of spaced apart sidewalls 320 are employed in each of the housing shells 310 to form half of the coupling recess 320. An upper wall 330 is employed to limit the amount by which the coupling neck 322 is inserted into the handle housing 300, while one or more conforming gussets 334 interconnect and strengthen the sidewalls 328 as well as support the section of the coupling neck 322 that is inserted into the handle housing 300. Each housing shell 310 includes a pair of bosses 340*a* and 340*b* that extend in a generally transverse direction into the coupling recess 320. The bosses 340*a* and 340*b* are generally similar to the first and second bosses 60 and 70 that are employed in the housing 40 of the head 12 in that one set of the bosses 340*b* is configured to be received into the other set of bosses 340*a* to aid in locating the housing shells 310 to one another. Additionally, as the bosses 340*a* and 340*b* extend through the coupling neck 322, the difference in the sizes of the bosses 340*a* and 340*b* is used to ensure that the coupling neck 322 will not be rotated relative to the handle housing 300 during the assembly of the vegetation trimmer 10 (see, FIG. 10).

Returning to FIG. 9, the cord recess 316 in the example provided is a hollow cylindrical area in the handle housing 300 located generally in-line and below both the primary handle 312 and the hand guard 314. The electrical contacts 304, which extend outwardly and rearwardly into the cord recess 316, are configured to be received into the female end of a suitable power cord 350 to connect the vegetation trimmer 10 to a source of electrical power. The handle housing 300 extends relatively farther rearwardly than the electrical contacts 304 to thereby ensure that the electrical contacts 304 will not become damaged if the vegetation trimmer 10 is dropped on the handle 14.

Figure 15:
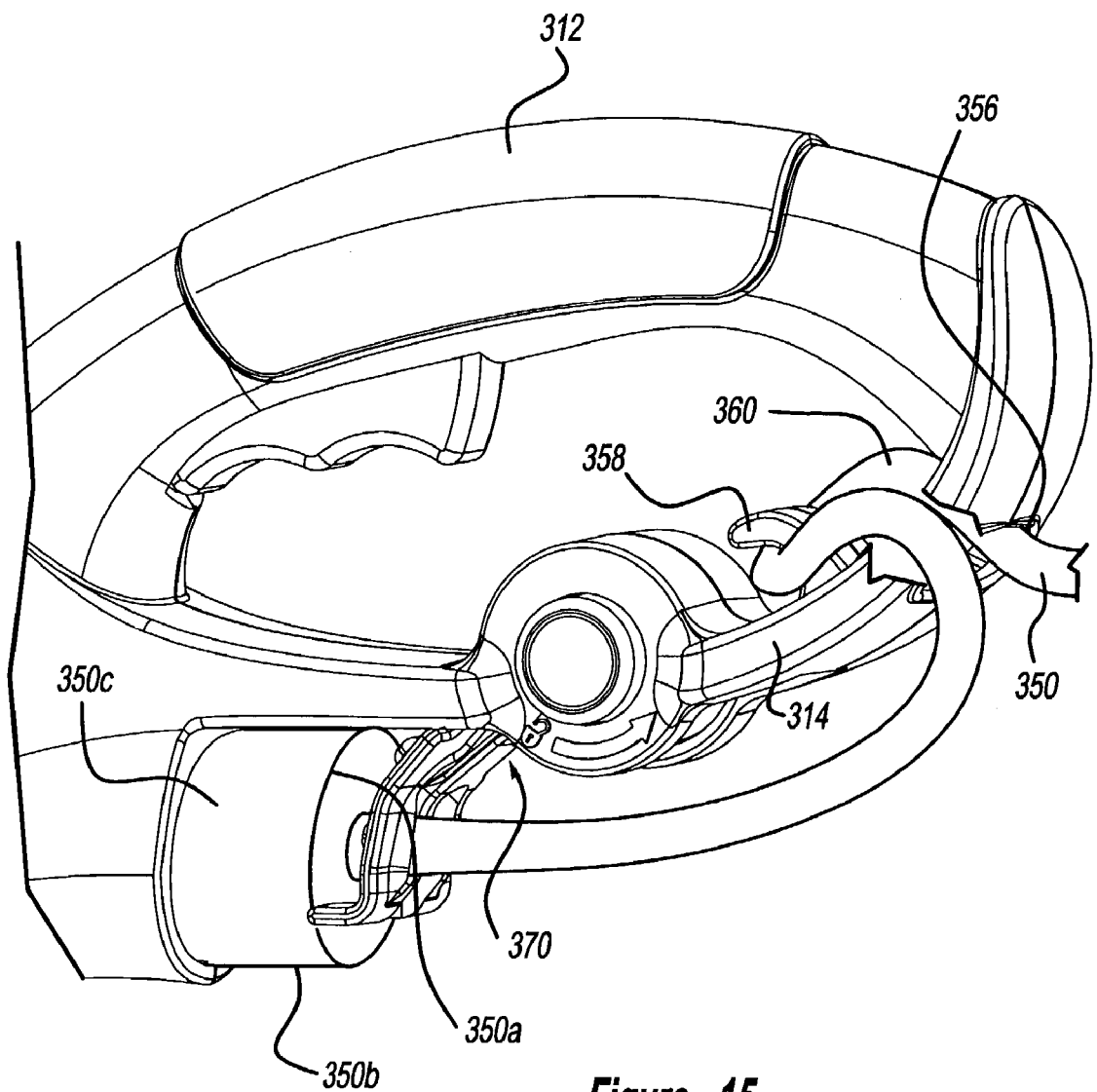
FIG. 15 is a side elevation view in partial cross section of the handle.

With reference to FIGS. 9 and 15, the hand guard 314 extends below the primary handle 312 and includes a cord aperture 356 and a cord hook 358 which are employed to aid in the securing of the power cord 350 to the vegetation trimmer 10. The cord aperture 356 is positioned rearwardly of the cord hook 358 and extends through the hand guard 314 in a direction that is generally transverse to the hand guard 314. The cord hook 358 is an arcuate structure that extends from the upper surface of the hand guard 314 and wraps forwardly in a direction away from the cord aperture 356. To secure the power cord 350 to the handle 14, a loop 360 is formed in the power cord 350, inserted through the cord aperture 356 and positioned over the cord hook 358 so that any tension that is applied to the power cord 350 as a result of dragging the power cord 350 over the ground or catching the power cord 350 on an obstruction is exerted against the cord hook 358 so that the female end of the power cord 350 will not be removed from the cord recess 316.

Figure 16:
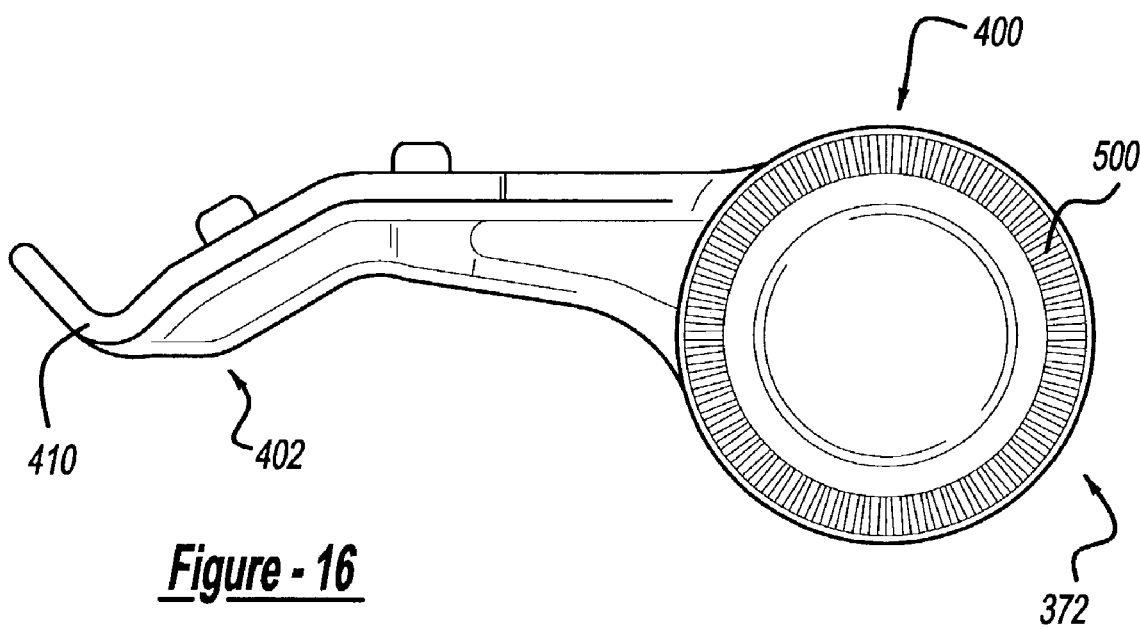
FIG. 16 is a left side elevation view of a portion of the handle, illustrating the abutting arm of the cord retainer in greater detail.
Figure 17:
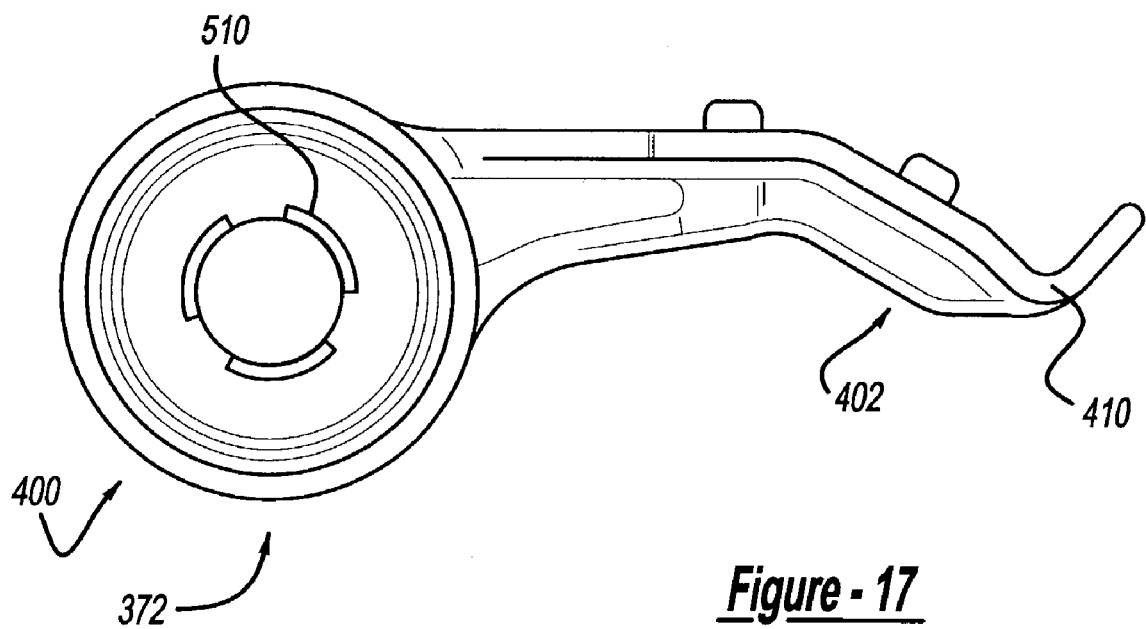
FIG. 17 is a right side elevation view of the abutting arm.
Figure 18:
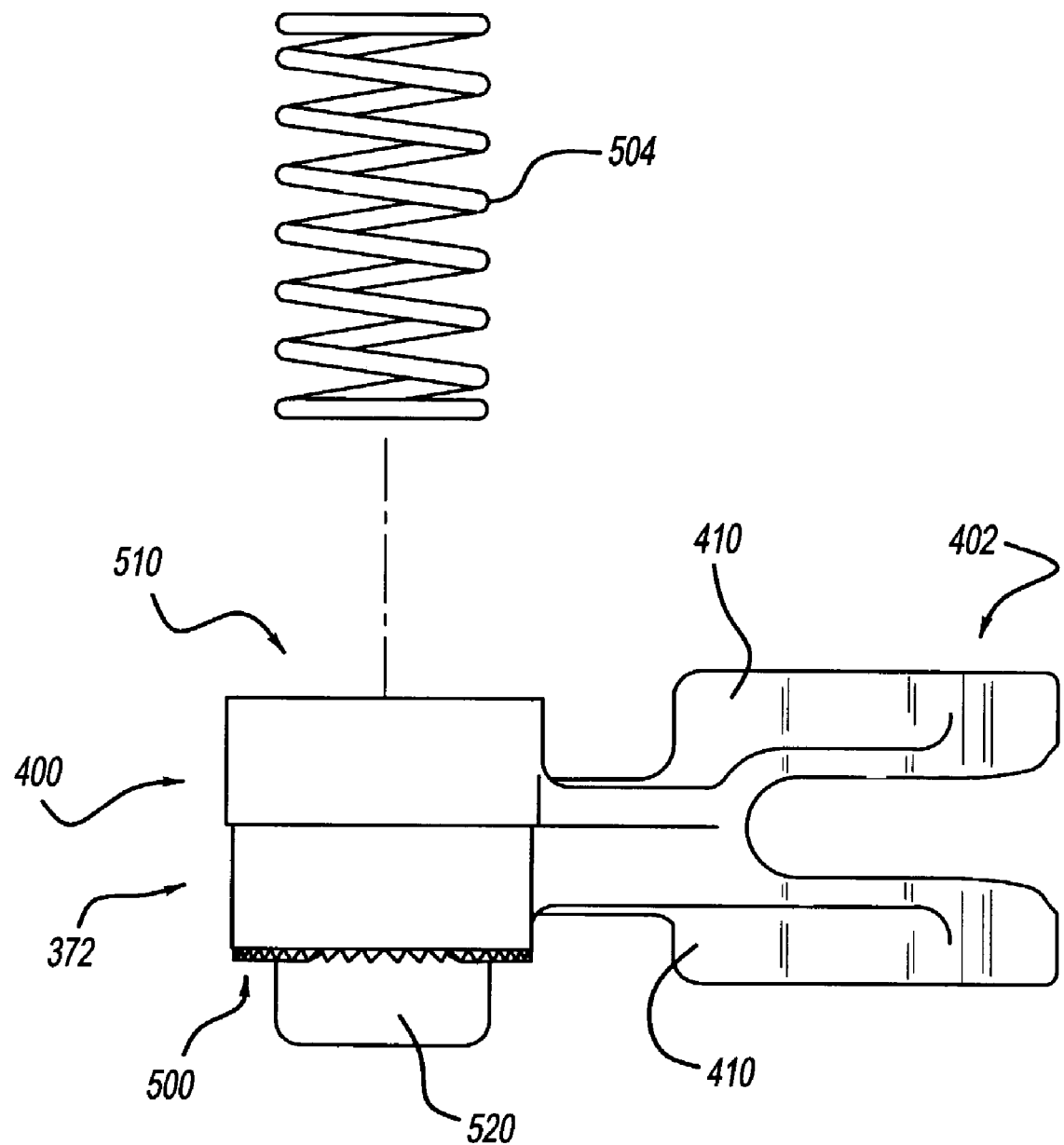
FIG. 18 is an exploded top plan view of a portion of the cord retainer illustrating the abutting arm and the spring.

To further guard against unwanted removal of the power cord 350 during the operation of the vegetation trimmer 10, an optional cord retainer 370 is provided. The cord retainer 370 includes an abutting arm 372 and a detent mechanism 374 for maintaining the abutting arm 372 in a desired position. With reference to FIGS. 16 through 18, the abutting arm 372 comprises a cylindrical hub portion 400 and Y-shaped fork 402 that extends outwardly away from the hub portion 400 and which includes a pair of spaced apart L-shaped tines 410.

Figure 19:
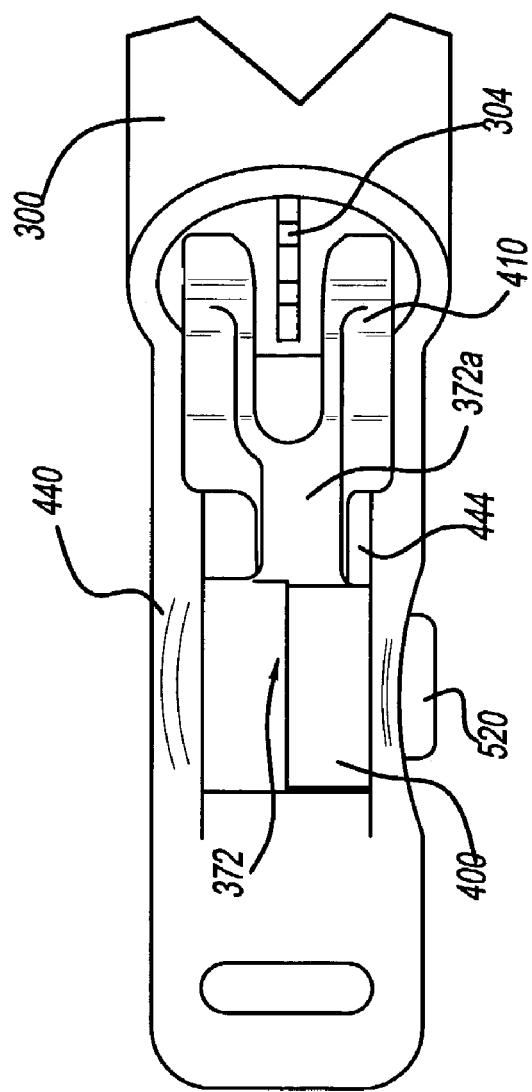
FIG. 19 is a bottom plan view of a portion of the handle.

With reference to FIGS. 15 and 19, the abutting arm 372 is received into a hub cavity 440 in the handle housing 300 such that a stem 372*a* of the Y-shaped fork 402 projects through a slot 444 formed through the hub cavity 440. The hub portion 400 is supported by the handle housing 300 for rotation in the hub cavity 440. Accordingly, the abutting arm 372 may be rotated between a rearward position, which does not inhibit withdrawal of the power cord 350 from the electrical contacts 304, and a forward position, wherein each of the tines 410 abuts either or both of the rear and bottom faces 350*a* and 350*b*, respectively, of the female end 350*c* of the power cord 350 to thereby inhibit the withdrawal of the power cord 350 from the electrical contacts 304.

In the example illustrated in FIGS. 9, 16, 18 and 20, the detent mechanism 374 includes a first set of detent teeth 500 formed on a lateral surface of the hub portion 400, a second set of detent teeth 502 formed on a housing shell 310 and projecting into the hub cavity 440 and a spring 504. The spring 504 is received into a hollow cavity 510 that is formed in the hub portion 400 and biases the hub portion 400 toward an associated housing shell 310 so that the detent teeth 500 and 502 engage one another. To disengage the detent teeth 500 and 502 from one another to permit the abutting arm 372 to be rotated, the user of the vegetation trimmer 10 need only push the abutting arm 372 laterally to further compress the spring 504 and simultaneously rotate the abutting arm 372 to the desired position. This is easily achieved since a push button 520 defined by the hub portion 400 extends through the hand guard 314 as shown in FIG. 19.

Trimmer Guard

Figure 21:
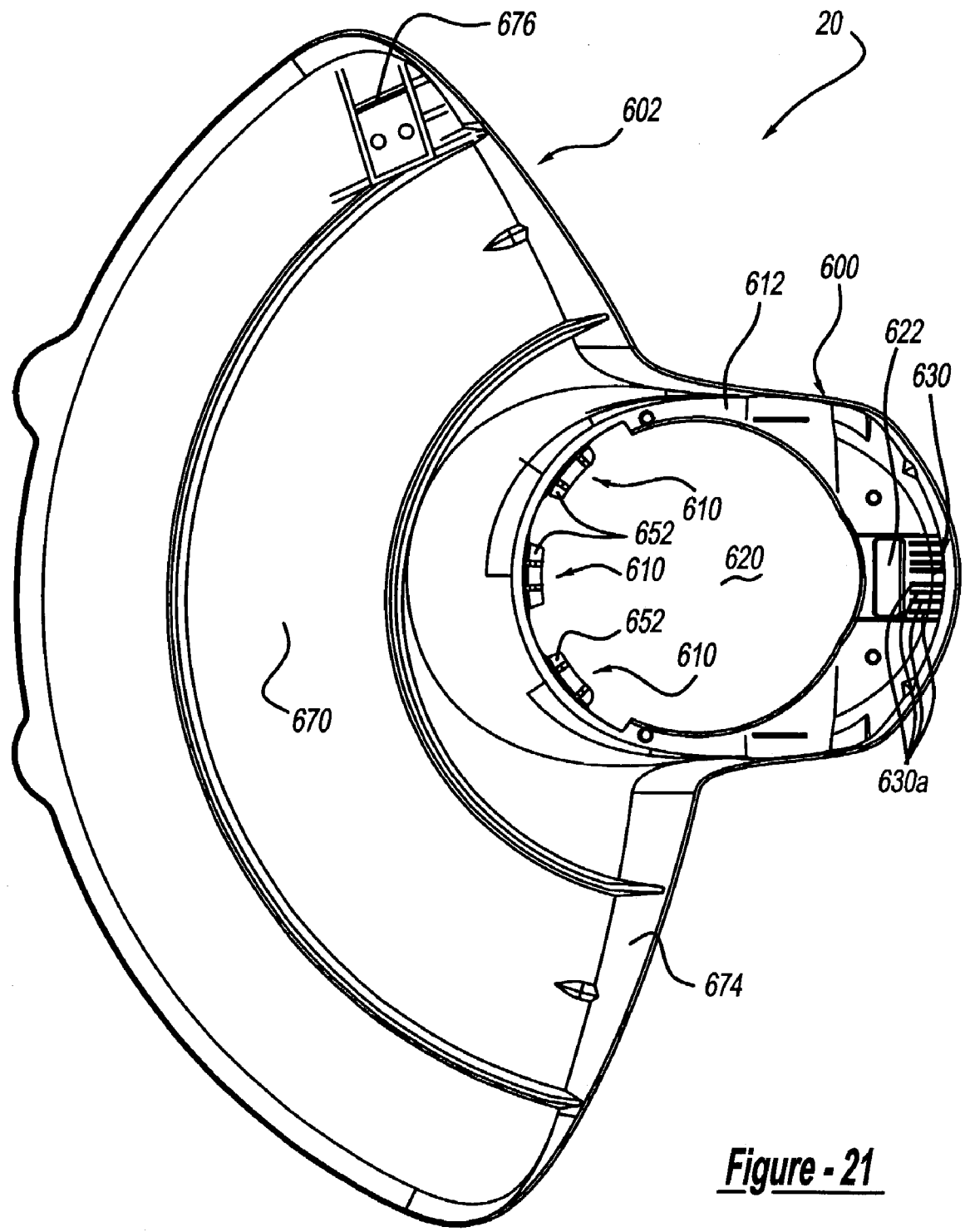
FIG. 21 is a bottom plan view of a portion of the vegetation trimmer of FIG. 1, illustrating the trimmer guard in greater detail.
Figure 22:
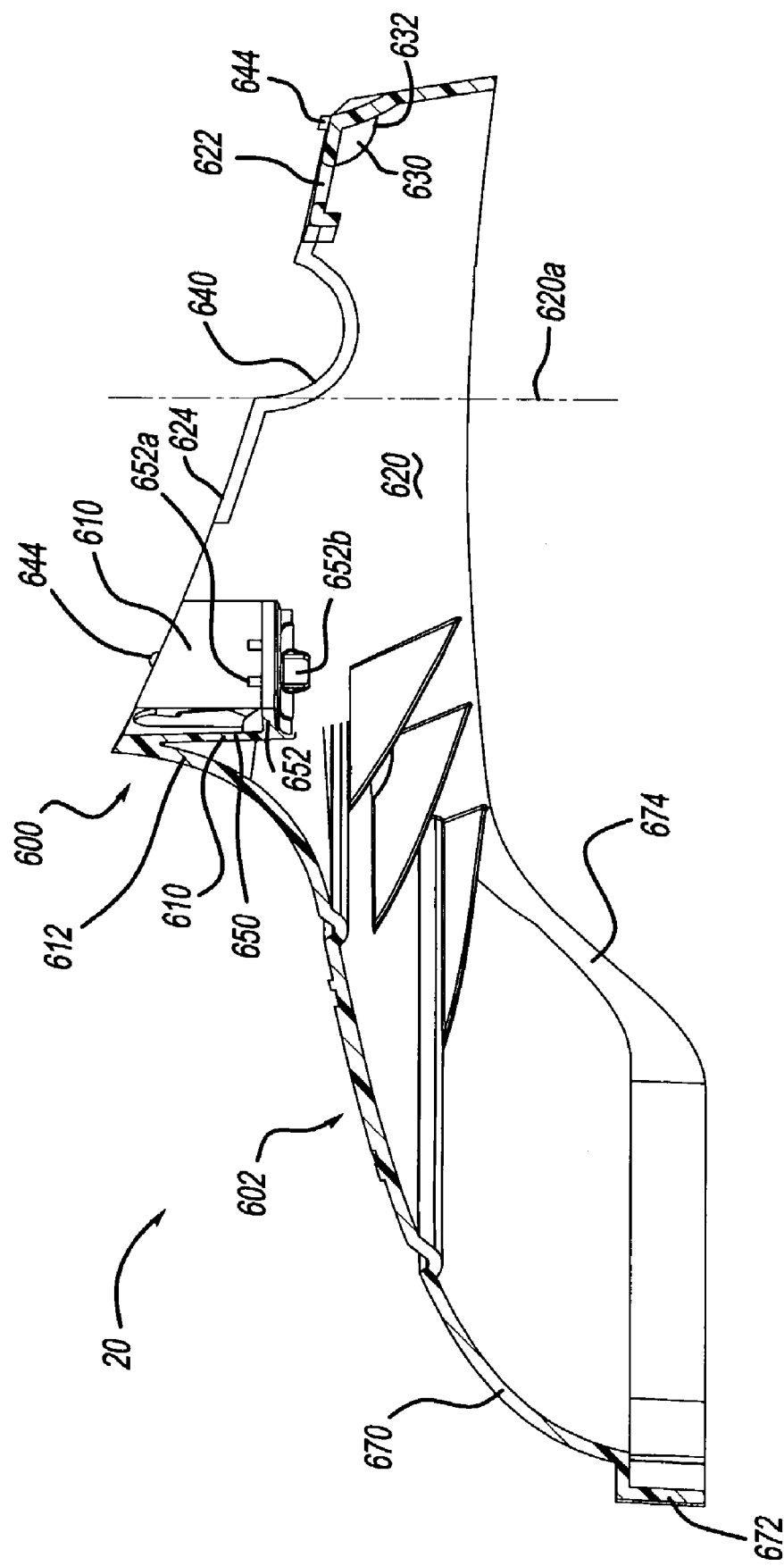
FIG. 22 is a longitudinal cross section of the trimmer guard.

As best seen in FIG. 21 and 22, the trimmer guard 20 includes a mounting portion 600 and a guard portion 602 and may be readily injection molded in a unitarily formed manner from a suitable plastic material, such as acrylonitrile butadiene styrene (ABS). To conserve space during the shipping of the vegetation trimmer 10 (FIG. 1) and its display on store shelves, the trimmer guard 20 is preferably installed after the vegetation trimmer 10 has been purchased. Accordingly, the novel configurations of the head 12 (FIG.

1) and the trimmer guard 20 permit the user to assemble the trimmer guard 20 to the head 12 of the vegetation trimmer 10 with increased speed and accuracy as compared with other known configurations.

The mounting portion 600 includes a plurality of retention tabs 610 and an annular structure 612 that defines a mounting aperture 620, a hook aperture 622 and a flange 624. In the example provided, the mounting aperture 620 is sized to receive therethrough both the projecting stem 130 and the tool head 30. Those skilled in the art will appreciate, however, that where relatively large tool heads are employed, such as large diameter cutting blades (not shown), the tool head or portions thereof may have to be removed to permit the mounting portion 600 to be mounted over the projecting stem 130.

Figure 20:
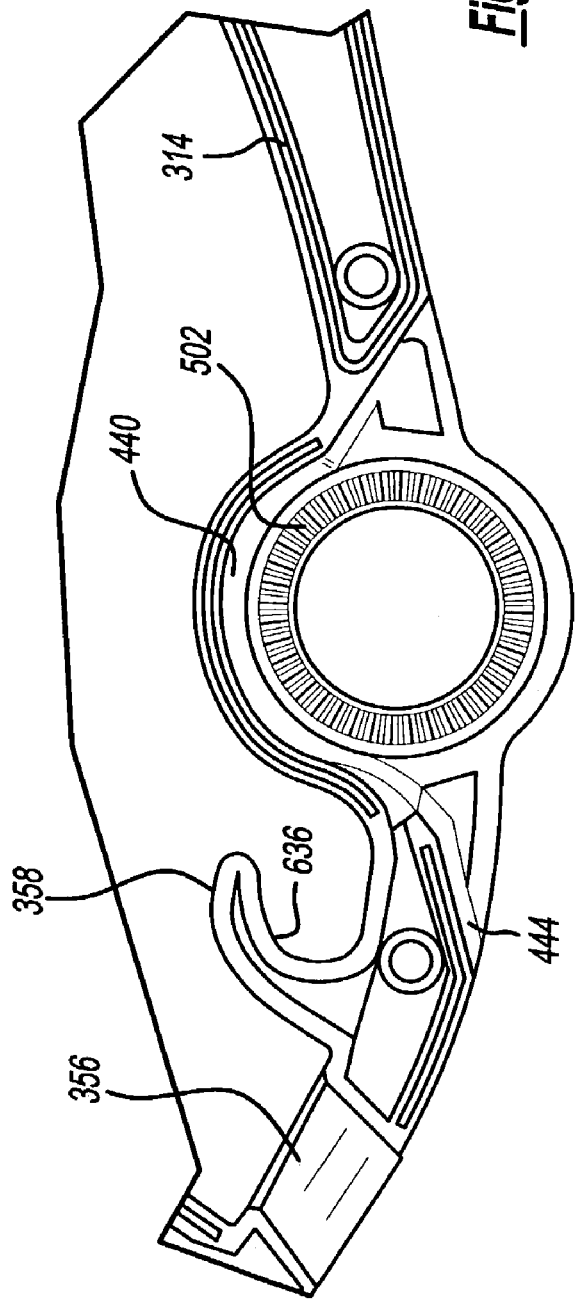
FIG. 20 is an enlarged portion of FIG. 14, illustrating the second set of detent teeth in greater detail.

The hook aperture 622 extends through the annular structure 612 and is sized to receive the engagement hook 134 that is formed on the head 12 of the vegetation trimmer 10. In the example provided, the hook aperture 622 is a laterally extending slotted aperture that is offset from the mounting aperture 620. Alternatively, the hook aperture 622 could intersect the mounting aperture 620. A conforming structure 630 is preferably formed into the lower surface of the annular structure 612 proximate the hook aperture 622. The conforming structure 630 has a rearwardly contoured face 632 that matches the contour of the front face 636 of the engagement hook 134 (FIG. 20). In the particular example provided, the conforming structure 630 includes a plurality of vertically extending ribs 630a.

The flange 624 is configured to at least partially mate to the abutting wall 132 (FIG. 7) on the head 12 of the vegetation trimmer 10 and includes a pair of arcuate recesses 640 that generally conform to the shape of the bosses 138 (FIG. 7). One or more raised portions 644 may be incorporated into the flange 624 to provide greater control over which the flange 624 and the abutting wall 132 (FIG. 7) contact one another to thereby reduce movement of the trimmer guard 20 relative to the head 12 of the vegetation trimmer 10.

Figure 23:
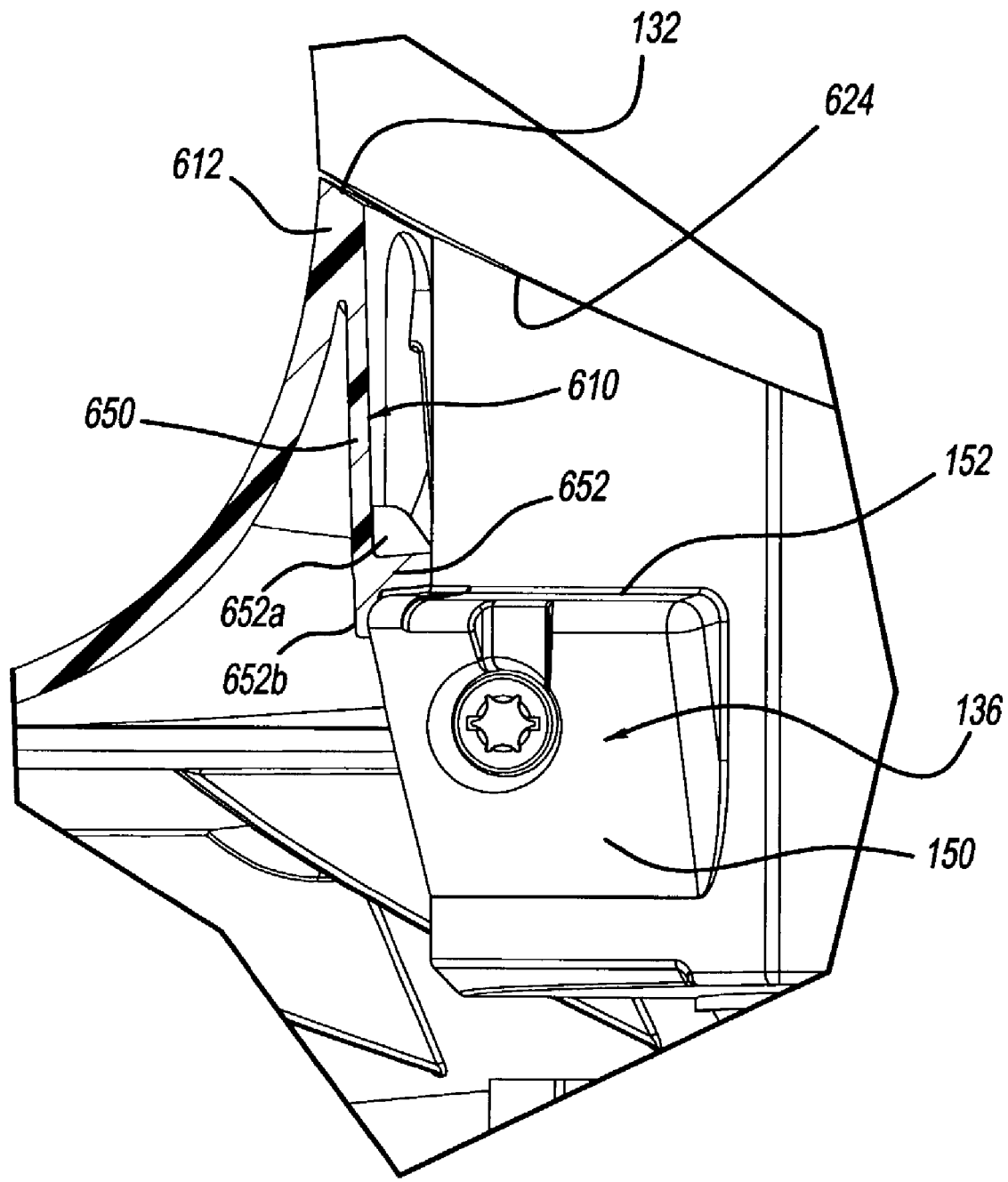
FIG. 23 is a side elevation view in partial cross section illustrating a portion of the trimmer guard as coupled to the head.

With additional reference to FIG. 23, the retention tabs 610 are generally L-shaped and comprise a leg portion 650 and a foot portion 652. The leg portion 650 is coupled to the annular structure 612 and extends downwardly therefrom into the mounting aperture 620 in a direction that is generally parallel to the axis 620a of the mounting aperture 620. Due to their relatively long length, the leg portions 650 may be deflected in a radially outward direction despite the relatively rigid nature of the material from which the trimmer guard 20 is molded. The foot portion 652 is coupled to the distal end of the leg portion 650 and extends generally perpendicularly therefrom (i.e., radially inwardly) into the mounting aperture 620. The retention tabs 610 may optionally include gussets 652a between the leg portion 650 and the foot portion 652 for stiffening the foot portion 652, and/or release tabs 652b formed on the side of the foot portion 652 opposite the leg portion 650 that can be used to apply a force to the retention tabs 610 to deflect them in a radially outward direction in the event that the trimmer guard 20 need be removed from the vegetation trimmer 10.

Returning to FIGS. 21 and 22, the guard portion 602 includes a wall member 670 that extends around at least a portion of the mounting portion 600. More specifically, the wall member 670 extends radially outwardly in a generally horizontal plane where it intersects the mounting portion 600, but curves downwardly with increasing distance from the mounting portion 600 so that its outer peripheral edge 672 is a generally vertically extending surface. The lateral sides 674 of the guard portion 602 taper downwardly and forwardly to form gussets that operatively stiffen the wall member 670. A conventional blade member 676, which is employed to limit the maximum length of the filament 52 (FIG. 1) that extends from the tool head 30 (FIG. 1), is coupled to the guard portion 602 in a conventional manner.

Figure 24:
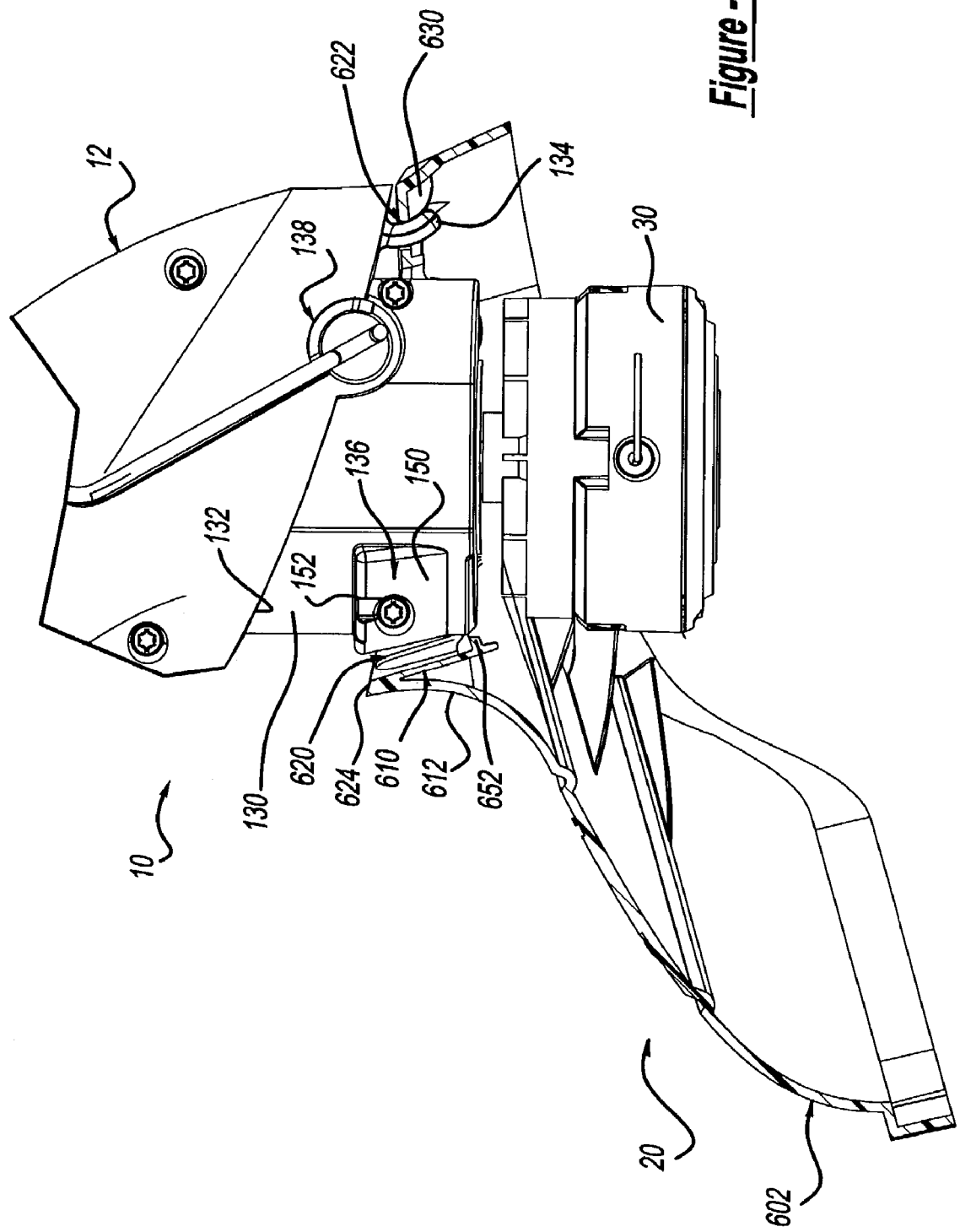
FIG. 24 is a side elevation view in partial cross section illustrating the coupling of the trimmer guard to the head.

To couple the trimmer guard 20 to the head 12 of the vegetation trimmer 10, the user inserts the tool head 30 through the mounting aperture 620 so that the engagement hook 134 is disposed in the hook aperture 622 and the annular structure 612 surrounds the projecting stem 130 as shown in FIG. 24. The engagement hook 134 operably locates the trimmer guard 20 to the head 12 in a desired orientation (i.e., placement of the engagement hook 134 through the hook aperture 622 prevents the trimmer guard 20 from being rotated relative to the projecting stem 130 into an undesired orientation). With the trimmer guard 20 positioned in this manner, the radially inner edges of the foot portions 652 of the retention tabs 610 abut the associated tapered legs 150 of the engagement ramps 136.

Figure 25:
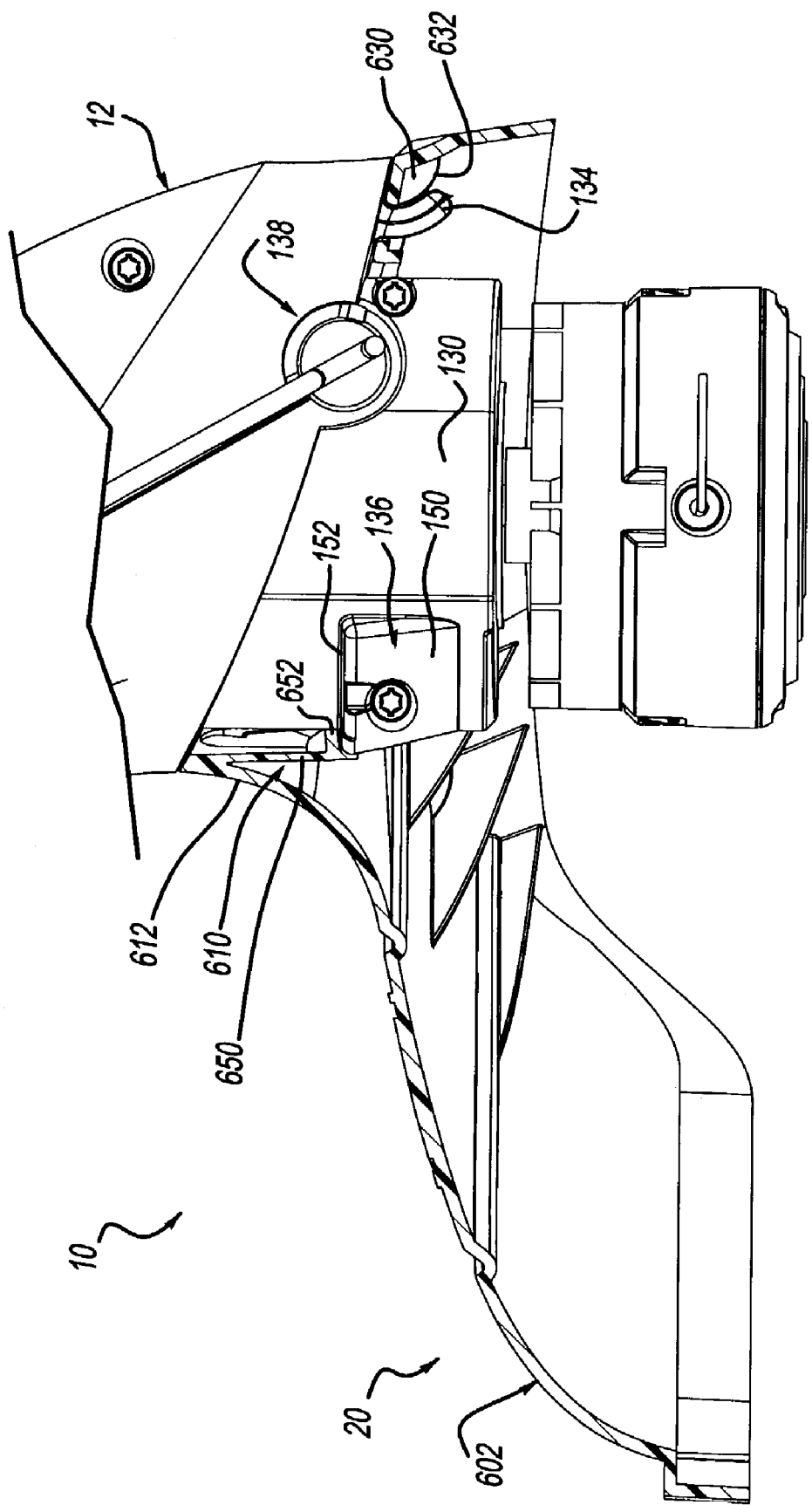
FIG. 25 is a view similar to that of FIG. 24, but illustrating the trimmer guard as coupled to the head.

Thereafter, the user may pushes the guard portion 602 of the trimmer guard 20 toward the abutting wall 132 so that the foot portions 652 of the retention tabs 610 ride over (i.e., resiliently deflect radially outwardly) the tapered legs 150 of the engagement ramps 136 and engage the abutting faces 152 of the engagement ramps 136 as illustrated in FIGS. 23 and 25. The conforming structure 630 serves to anchor the trimmer guard 20 against the engagement hook 134 to provide leverage point that is well positioned opposite the retention tabs 610. The arcuate form of the engagement hook 134 and the conforming nature of the conforming structure 630 cooperate to maintain the side of the trimmer guard 20 opposite the retention tabs 610 in contact with the abutting wall 132 as well as further ensure against any radial misalignment between the trimmer guard 20 and the head 12 of the vegetation trimmer 10. With the trimmer guard 20 attached to the head 12, the retention tabs 610 and the conforming structure 630 contact the engagement ramps 136 and the engagement hook 134, respectively, to limit axial movement of the trimmer guard 20 relative to the projecting stem 130, while the placement of each of the bosses 138 in an associated one of the arcuate recesses 640 operates (illustrated in FIG. 1) to limit movement of the trimmer guard 20 relative to the projecting stem 130 in a radial direction.

Packaging & Shipping

As noted above and with reference to FIGS. 2, 9 and 10, the vegetation trimmer 10 is equipped with a retainer 42 and at least one keyhole (i.e., at least keyhole 250), which permits the intermediate portion 16 to be rotated relative to the head. In the particular example provided, two keyholes are employed (i.e., keyholes 250 and 252) to permit the position of the intermediate portion 16 to be fixed relative to the head 12 at two different positions that are 180° apart from one another.

Figure 26:
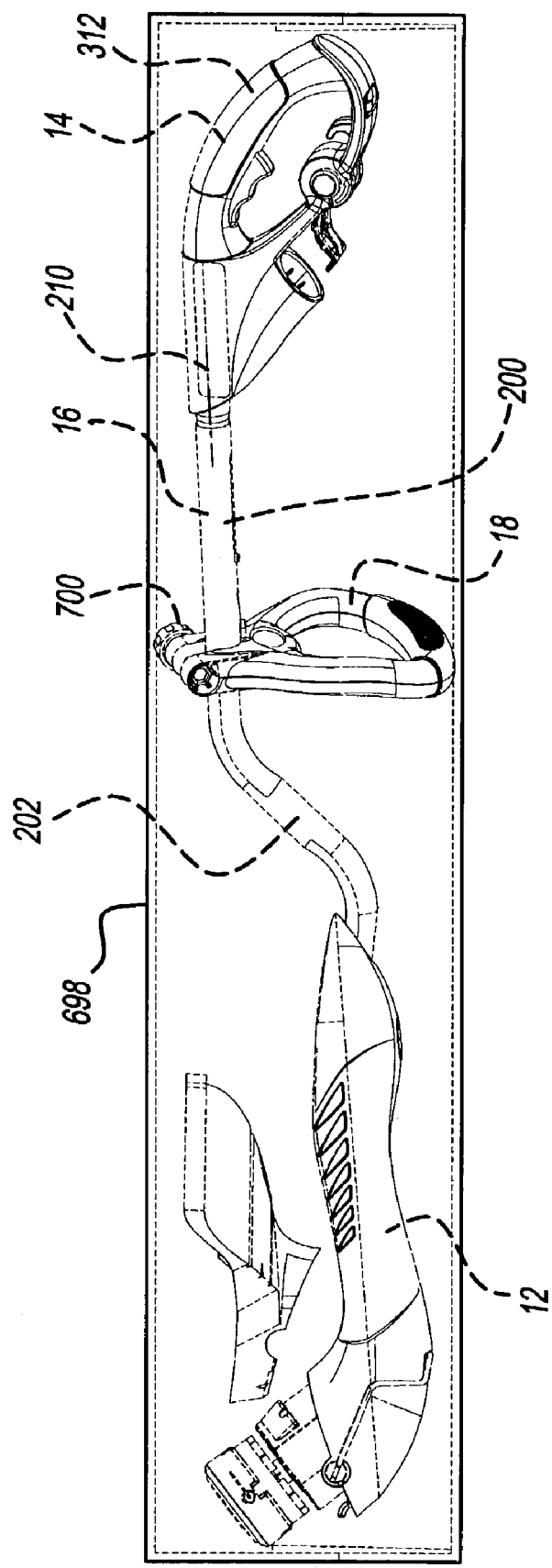
FIG. 26 is a view of the vegetation trimmer as packaged in a relatively small container and with the intermediate portion rotated relative to the head into a shipping orientation.

The capability of the intermediate portion 16 to rotate relative to the head 12 greatly improves the package-ability of the vegetation trimmer 10. In this regard, rotating the intermediate portion 16 through a predetermined angle, such as 180°, from its "operational" orientation (e.g., FIG. 9) into a "shipping" orientation (e.g., FIG. 26) so as to take up considerably less space and therefore be packaged in a relatively smaller container 698 (FIG. 26) to reduce shipping costs and consume less display space on store shelves. As shown in FIG. 26, placement of the intermediate portion 16 into the shipping orientation orients the handle 14 in an up-side down manner so that the primary handle 312 is positioned on an opposite side of the axis 210 of the first portion 200 of the intermediate portion 16 relative to the head 12. The "jog" provided by the second portion 202 of the intermediate portion 16 provides the space that is needed to store the auxiliary handle 18 so that the auxiliary handle 18 may be attached to the vegetation trimmer 10 (via a conventional thumb screw 700) before it is shipped.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A vegetation trimmer comprising:
a head having a motor for moving a tool;
a handle having a switch for operating the motor; and
an intermediate portion interconnecting the head to the handle, the intermediate portion having a first portion, a second portion and a third portion, each of the first, second and third portions being arranged about a respective axis, the first portion being coupled to a primary handle at a first end and to the second portion at a second end, the second portion being coupled to the third portion at an end of the second portion opposite its connection to the first portion, an opposite end of the third portion being coupled to the head,
wherein the axis of the second portion intersects the axes of the first and third portions, wherein the first portion is longer than the second portion, wherein the third portion extends between the head and the handle along a first slope and the second portion extends between the head and the handle along a second slope that is greater than the first slope when the vegetation trimmer is positioned in an operating orientation, and wherein an auxiliary handle is coupled to the first portion of the intermediate portion; and
wherein the placement of the vegetation trimmer in the operating orientation places the tool such that it is rotated about a generally vertical axis and wherein the second portion is disposed generally vertically when the vegetation trimmer is placed in the operating orientation.

2. The vegetation trimmer of claim 1, wherein an angle between the first and second portions is an obtuse angle.

3. The vegetation trimmer of claim 2, wherein the angle is about 110° to about 150°.

4. The vegetation trimmer of claim 3, wherein the angle is about 130° to about 140°.

5. The vegetation trimmer of claim 1, wherein an angle between the second and third portions is equal in magnitude to the angle between the first and second portions.

6. The vegetation trimmer of claim 1, wherein an angle between the second and third portions is about 110° to about 150°.

7. The vegetation trimmer of claim 6, wherein the angle is about 130° to about 140°.

8. The vegetation trimmer of claim 1, further comprising a wire interconnecting the motor to the switch, the wire extending at least partially through the intermediate portion.

9. The vegetation trimmer of claim 1, wherein the intermediate portion is selectively positionable relative to at least one of the head and the handle in a shipping orientation and an operating orientation.

10. The vegetation trimmer of claim 9, wherein the intermediate portion is rotatably disposed in the trimmer head, and wherein the vegetation trimmer further comprises a retainer that permits the intermediate portion to be fixedly but releasably engaged to the trimmer head in the operating orientation.

11. The vegetation trimmer of claim 10, wherein the retainer further permits the intermediate portion to be fixedly but releasably engaged to the trimmer head in the shipping orientation.

12. The vegetation trimmer of claim 1, wherein the intermediate portion has a developed length and a length of the first portion is about 40% to about 70% of the developed length.

13. The vegetation trimmer of claim 12, wherein a length of the second portion is about 10% to about 30% of the developed length.

14. The vegetation trimmer of claim 1, wherein one of the handle and the intermediate portion includes a coupling neck extending therefrom and the other one of the primary handle and the intermediate portion includes a coupling recess formed therein that is configured to receive the coupling neck.

15. The vegetation trimmer of claim 1, wherein the intermediate portion includes an upper member and a lower member that are telescopically coupled to one another.

16. The vegetation trimmer of claim 15, wherein the intermediate portion includes a locking mechanism having a detent pin that is movably coupled to one of the upper member and the lower member and a plurality of detent holes formed in the other one of the upper member and the lower member, the detent holes being spaced apart along the axis of the intermediate portion, wherein engagement of the detent pin to one of the detent holes operates to lock the upper and lower members to one another.

17. The vegetation trimmer of claim 15, wherein the intermediate portion is selectively positionable relative to at least one of the head and the handle in a shipping orientation and an operating orientation.

18. The vegetation trimmer of claim 17, wherein the intermediate portion is rotatably disposed in the trimmer head, and wherein the vegetation trimmer further comprises a retainer that permits the intermediate portion to be fixedly but releasably engaged to the trimmer head in the operating orientation.

19. The vegetation trimmer of claim 18, wherein the retainer also permits the intermediate portion to be fixedly but releasably engaged to the trimmer head in the shipping orientation.

* * * * *